United States Patent
Doi et al.

(10) Patent No.: US 6,266,061 B1
(45) Date of Patent: *Jul. 24, 2001

(54) USER INTERFACE APPARATUS AND OPERATION RANGE PRESENTING METHOD

(75) Inventors: Miwako Doi, Kawasaki; Akira Morishita, Tokyo; Naoko Umeki, Kawasaki; Shunichi Numazaki, Yokohama, all of (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,696

(22) Filed: Jan. 20, 1998

(30) Foreign Application Priority Data

Jan. 22, 1997 (JP) .................................... 9-009496
Jan. 22, 1997 (JP) .................................... 9-009773

(51) Int. Cl.$^7$ .................................... G06F 13/00
(52) U.S. Cl. .................... 345/358; 345/156; 382/190
(58) Field of Search .................... 345/358, 157, 345/158, 168, 173, 179, 180, 184, 156; 382/190, 199, 201, 203, 312

(56) References Cited

U.S. PATENT DOCUMENTS

| | | | | |
|---|---|---|---|---|
| 5,581,276 | * | 12/1996 | Cipolla et al. | 345/156 |
| 5,594,469 | * | 1/1997 | Freeman et al. | 345/158 |
| 5,801,704 | * | 9/1998 | Oohara et al. | 345/358 |
| 5,900,863 | * | 5/1999 | Numazaki | 345/158 |

* cited by examiner

*Primary Examiner*—Ba Huynh
(74) *Attorney, Agent, or Firm*—Oblon, Spivak, McClelland, Maier & Neustadt, P.C.

(57) ABSTRACT

A user interface apparatus for performing input by image processing of an input image includes a unit for switching a mode for performing pointing and other modes on the basis of a result of the image processing of the input image. A user interface apparatus for performing input by image processing of an input image includes a unit for switching at least a cursor move mode, a select mode, and a double click mode on the basis of a result of the image processing of the input image. A user interface apparatus for performing input by image processing includes a unit for checking whether an object of image processing is in a proper range within which the image processing is possible, and a unit for presenting at least one of predetermined visual information and audio information, if it is determined that the object is outside the proper range. For example, the cursor is made smaller and/or lighter in color or made larger if the object is farther or closer, respectively, than the proper range, and the left or the right side of the cursor is deformed if the object falls outside the proper range to the left or the right.

4 Claims, 35 Drawing Sheets

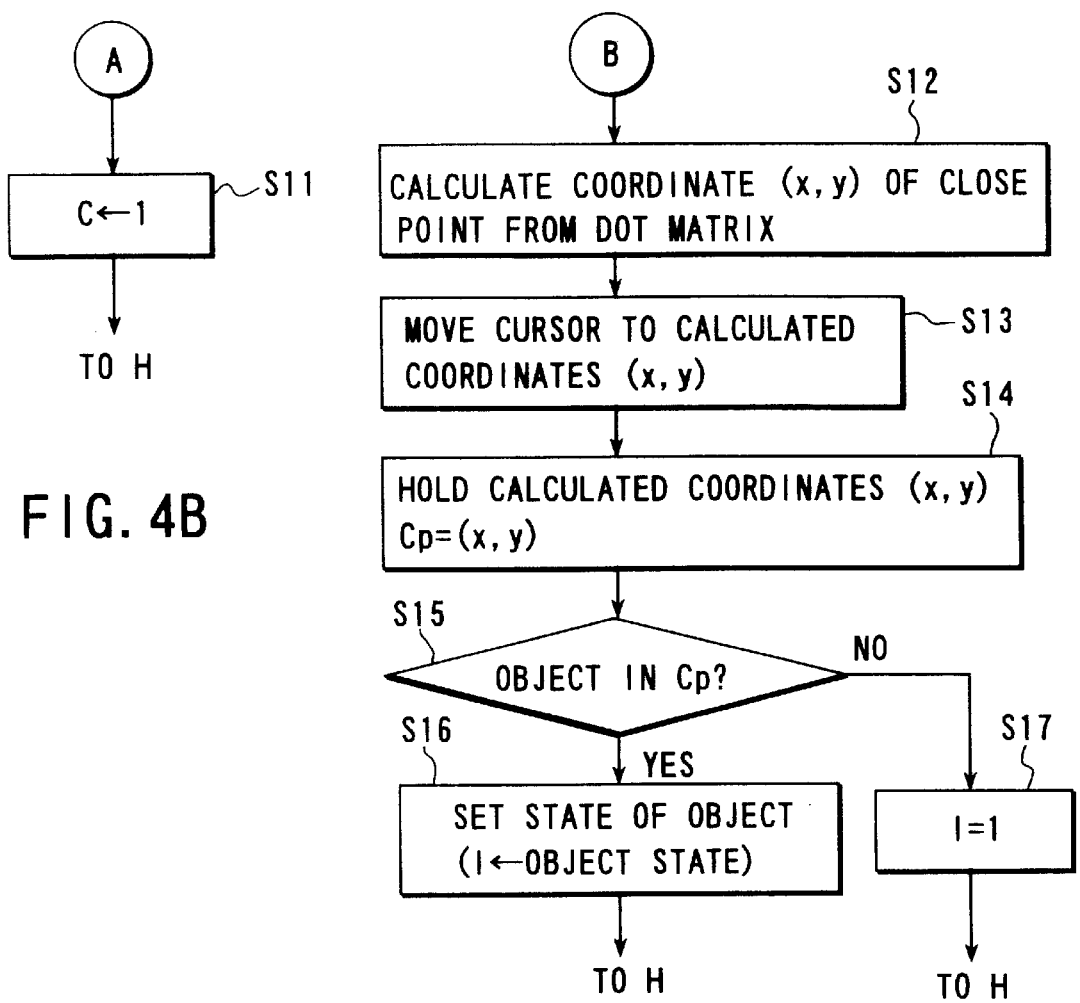
FIG. 4B
FIG. 4C
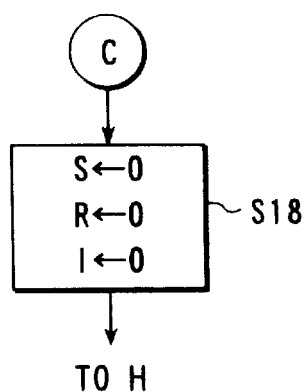
FIG. 4D

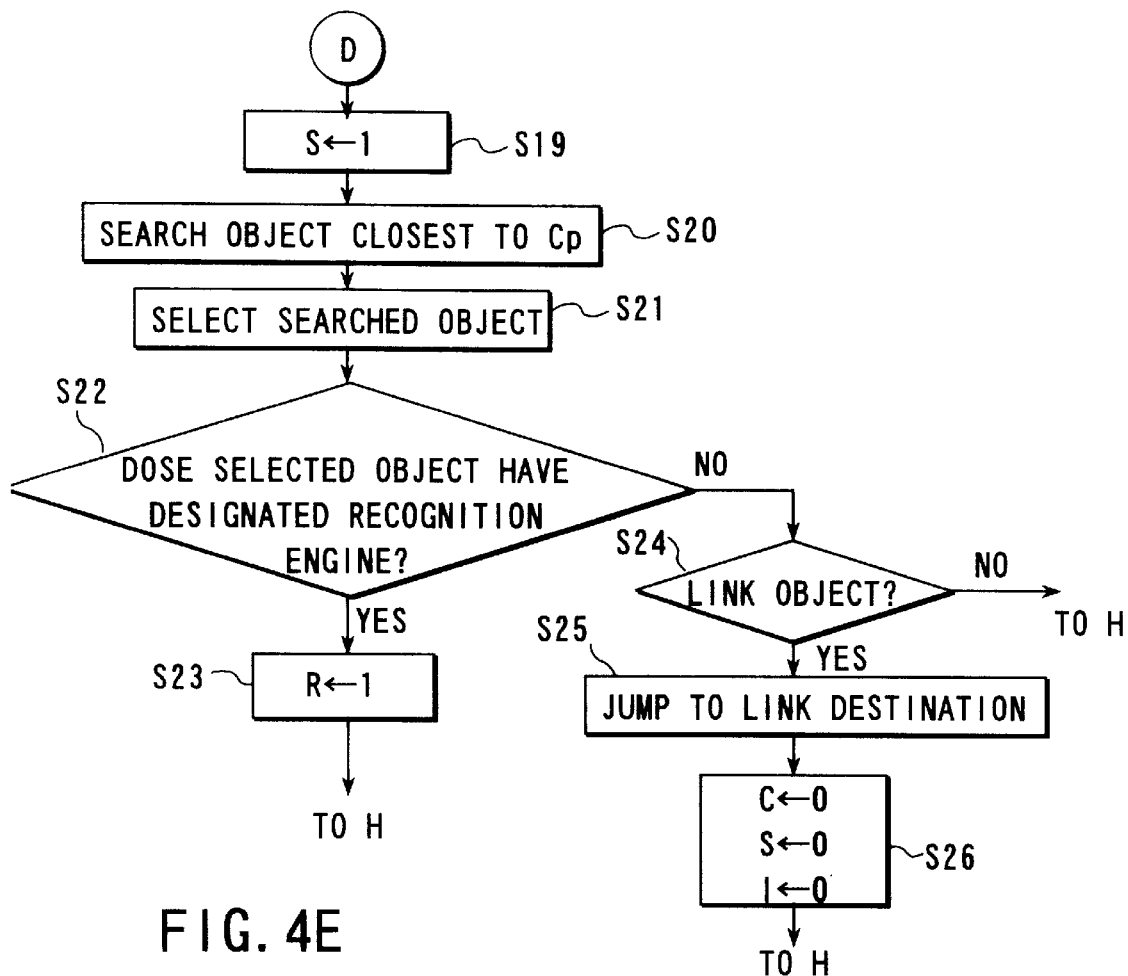
FIG. 4E
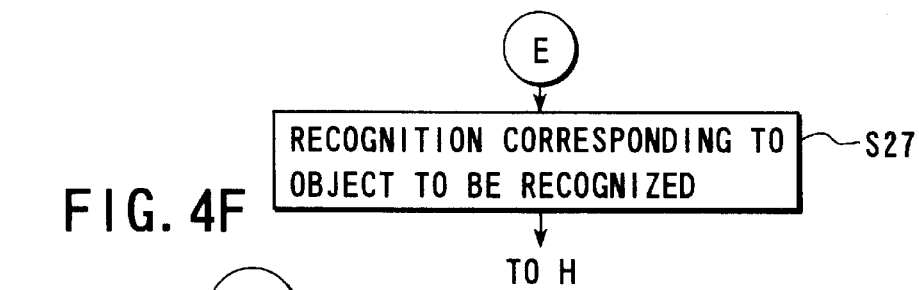
FIG. 4F
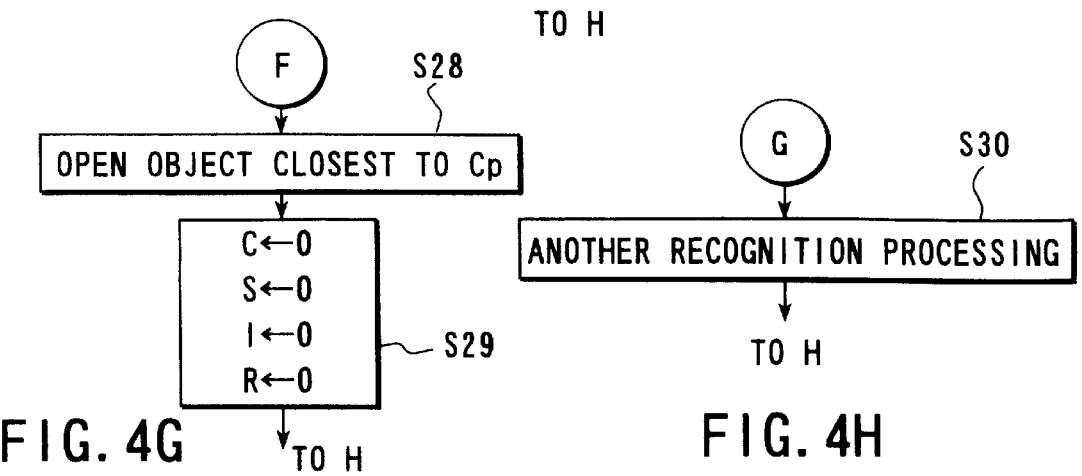
FIG. 4G
FIG. 4H

FIG. 11A

FIG. 11B (OBJECT : VERTICAL SLIDER BAR
    (SELECT RECOGNITION ENGINE : SELECT ENGINE)
    MOVEMENT RECOGNITION ENGINE : NEAREST POINT
    VERTICAL DIRECTION ENGINE (SCALE : 1) ) )

(OBJECT : HORIZONTAL SLIDER BAR
    (SELECT RECOGNITION ENGINE : SELECT ENGINE)
    MOVEMENT RECOGNITION ENGINE : NEAREST POINT
    HORIZONTAL DIRECTION ENGINE (SCALE : 1) ) )

(OBJECT : WINDOW LEFT SIDE CENTER
    (SELECT RECOGNITION ENGINE : SELECT ENGINE)
    MOVEMENT RECOGNITION ENGINE : NEAREST POINT
    HORIZONTAL DIRECTION ENGINE (SCALE : 1) ) )

(OBJECT : WINDOW UPPER SIDE CENTER
    (SELECT RECOGNITION ENGINE : SELECT ENGINE)
    MOVEMENT RECOGNITION ENGINE : NEAREST POINT
    VERTICAL DIRECTION ENGINE (SCALE : 1) ) )

FIG. 20

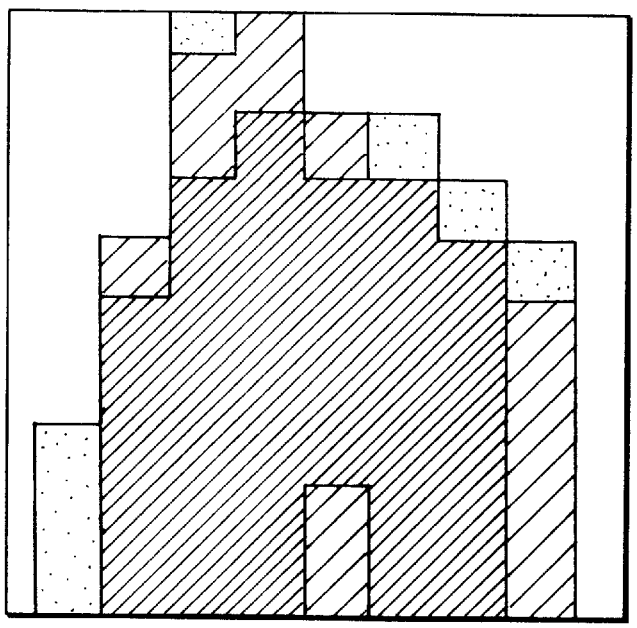
F I G. 34A
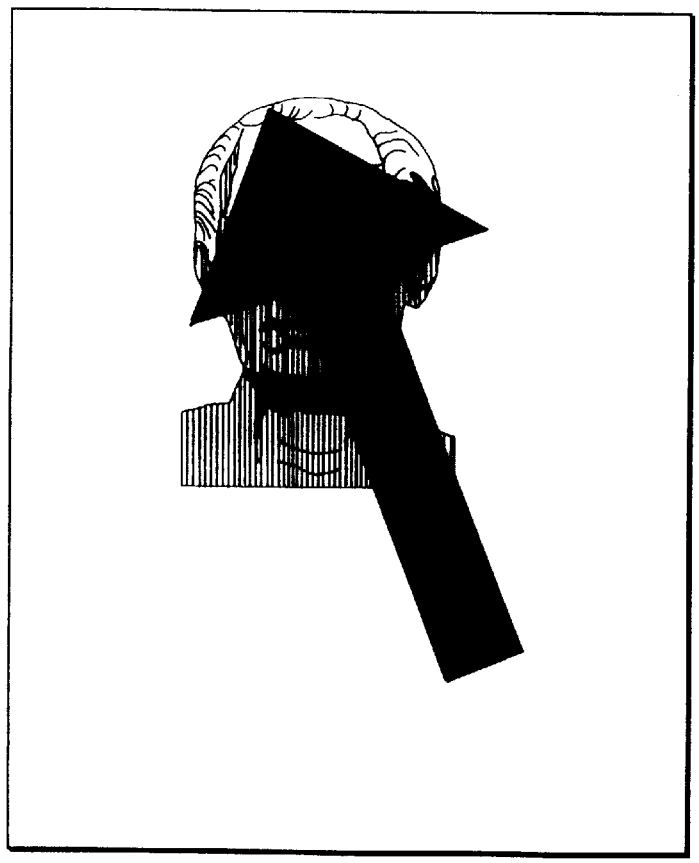
F I G. 34B

USER INTERFACE APPARATUS AND OPERATION RANGE PRESENTING METHOD

BACKGROUND OF THE INVENTION

This application is based on Japanese Patent Applications No. 9-9496 filed on Jan. 22, 1997 and No. 9-9773 filed on Jan. 22, 1997, the contents of which are cited herein by reference.

The present invention relates to a user interface apparatus and an input method of performing input by image processing.

A mouse is overwhelmingly used as a computer input device. However, operations performable by using a mouse are, e.g., cursor movement and menu selection, so a mouse is merely a two-dimensional pointing device. Since information which can be handled by a mouse is two-dimensional information, it is difficult to select an object with a depth, e.g., an object in a three-dimensional space. Also, in the formation of animation, it is difficult for an input device such as a mouse to add natural motions to characters.

To compensate for the difficulties of pointing in a three-dimensional space, several apparatuses have been developed. Examples are an apparatus for inputting information in six-axis directions by pushing and rolling a ball in a desired direction and apparatuses called a data glove, a data suit, and a cyber glove which are fitted on a hand or the like. Unfortunately, these apparatuses are presently less popular than they were initially expected because of their poor operability.

On the other hand, a direct indicating type input apparatus has been recently developed by which a user can input intended information by gesture without handling any special equipment.

For example, light is irradiated, reflected light from the hand of a user is received, and an image of the received light is formed to perform fine extraction or shape recognition processing, thereby executing control in accordance with the shape of the hand, moving a cursor in accordance with the moving amount of the hands or changing the visual point in a three-dimensional model.

Alternatively, the motion of the hand of a user is videotaped, and processes similar to those described above are performed by analyzing the video image.

By the use of these apparatuses, a user can easily perform input by gesture without attaching any special equipment.

In these apparatuses, however, various modes such as a cursor move mode, a select mode, and a double click mode are fixedly used. To change the mode, therefore, a user must perform an explicit operation of changing the mode, resulting in an additional operation load on the user.

Also, in these apparatuses, a light-receiving device for detecting an object is fixedly installed. This limits the range within which the hand of a user or the like can be correctly detected. Accordingly, depending on the position of the hand of a user or the like, the shape or the motion of the hand or the like cannot be accurately detected. The result is the inability to realize control or the like desired by the user. Additionally, it is difficult for the user to immediately recognize the above-mentioned detectable range in a three-dimensional space. Therefore, the user must learn operations in the detectable range from experience. This also results in an additional operation load on the user.

BRIEF SUMMARY OF THE INVENTION

It is an object of the present invention to provide a user interface apparatus for performing input by image processing, which reduces the operation load on a user and is easier to use, and an instruction input method.

It is another object of the present invention to provide a user interface apparatus for performing an input operation by image processing, which reduces the operation load on a user and is easier to use, and an operation range presenting method.

To achieve the above objects, according to the first aspect of the present invention, a user interface apparatus comprises: means for cutting out an image to be processed from an input image and performing image processing; and means for switching a mode for performing pointing and other modes on the basis of a result of the image processing of the input image.

According to the second aspect of the present invention, a user interface apparatus comprises: means for cutting out an image to be processed from an input image and performing image processing; and means for switching at least a cursor move mode, a select mode, and a double click mode on the basis of a result of the image processing of the input image.

Preferably, the apparatus further comprises means for designating a recognition method (recognition engine) of limiting image processing contents for each object selectable in the select mode, wherein the image processing of the input image is performed for a selected object in accordance with a recognition method designated for the object.

Preferably, the apparatus further comprises means for designating a recognition method (recognition engine) of limiting image processing contents for each object selectable in the select mode, and means for presenting, near a displayed object indicated by a cursor, information indicating a recognition method designated for the object.

Preferably, the apparatus further comprises means for presenting the result of the image processing of the input image in a predetermined shape on a cursor.

According to still another aspect of the present invention, a user interface apparatus comprises a first device for inputting a reflected image, and a second device for performing input by image processing of an input image, wherein the second device comprises means for designating a recognition method (recognition engine) of limiting contents of image processing of an input image with respect to the first device, and the first device comprises means for performing predetermined image processing on the basis of the designated recognition method, and means for sending back the input image and a result of the image processing to the second device.

Preferably, the first device may further comprise means for requesting the second device to transfer information necessary for image processing suited to a necessary recognition method, if the first device does not have image processing means (recognition engine) suited to the recognition method, and the second device may further comprise means for transferring the requested information to the first device.

Preferably, each of the first and second devices may further comprise means for requesting, when information necessary for image processing suited to a predetermined recognition method in the device is activated first, the other device to deactivate identical information, and means for deactivating information necessary for image processing suited to a predetermined recognition method when requested to deactivate the information by the other device.

According to still another aspect of the present invention, an instruction input method comprises the steps of performing image processing for an input image of an object, and switching a mode for performing pointing and other modes on the basis of a result of the image processing.

According to still another aspect of the present invention, an instruction input method using a user interface apparatus including a first device for inputting a reflected image and a second device for performing input by image processing of an input image comprises the steps of allowing the second device to designate a recognition method (recognition engine) of limiting contents of image processing of an input image with respect to the first device, and allowing the first device to perform predetermined image processing on the basis of the designated recognition method and send back the input image and a result of the image processing to the second device.

The present invention obviates the need for an explicit operation performed by a user to switch modes such as a cursor move mode, a select mode, and a double click mode.

Also, the present invention eliminates the need for calibration done by an operation by a user because a point designated by the user is read by recognition processing and reflected on, e.g., cursor movement on the screen.

Furthermore, the input accuracy and the user operability can be expected to be improved by the use of image processing means (recognition engine) suited to a necessary recognition method.

Additionally, the operation state can be fed back to a user by superposing a semitransparent input image on a cursor.

As described above, the present invention can provide a user interface apparatus which reduces the operation load on a user and is easier to use.

In the present invention, recognition processing is performed to some extent in the first device (on the device side). Therefore, it is possible to distribute the load and increase the speed of the recognition processing as a whole.

Also, the function of a device having an image input function can be improved.

Note that the invention related to each of the above apparatuses can also be established as an invention related to a method.

Note also that each of the above inventions can be established as a mechanically readable medium recording programs for allowing a computer to execute a corresponding procedure or means.

According to still another aspect of the present invention, a user interface apparatus for performing input by image processing comprises means for checking whether an object of image processing is in a proper range within which the image processing is possible, and means for presenting at least one of predetermined visual information and audio information, if it is determined that the object is outside the proper range.

In the present invention, if an object such as the hand of a user falls outside a proper range, this information is presented by using a display device or a sound reproducing device. Therefore, the user can easily recognize the proper range in a three-dimensional space and input a desired instruction or the like by performing gesture in the proper range.

According to still another aspect of the present invention, a user interface apparatus for performing input by image processing comprises means for checking whether an object of image processing is in a proper range within which the image processing is possible and, if the object is outside the proper range, checking a direction in which the object falls outside the proper range, and means for informing a user of a direction in which the object deviates from the proper range by changing a display state of a cursor displayed on a display screen into a predetermined state, if it is determined that the object is outside the proper range.

In the present invention, if an object such as the hand of a user deviates from a proper range, the display state of a cursor displayed on the display screen is changed into a predetermined state to inform the user of a direction in which the object deviates from the proper range. Therefore, the user can visually recognize the direction in which the object deviates from the proper range and can also easily and immediately correct the position of the object. Consequently, the user can easily recognize the proper range in a three-dimensional space and input a desired instruction or the like by performing gesture in the proper range.

Preferably, the cursor is made smaller and/or lighter in color if it is determined that the object is farther than the proper range.

Preferably, the cursor is made larger if it is determined that the object is closer than the proper range.

Preferably, a left side of the cursor is deformed if it is determined that the object falls outside the proper range to the left.

Preferably, a right side of the cursor is deformed if it is determined that the object falls outside the proper range to the right.

Preferably, the apparatus further comprises means for informing a user of a direction in which the object deviates from the proper range by using sound, if it is determined that the object is outside the proper range.

According to still another aspect of the present invention, a user interface apparatus for performing input by image processing comprises means for checking whether an object of image processing is in a proper range within which the image processing is possible and, if the object is outside the proper range, checking a direction in which the object deviates from the proper range, and means for informing a user of a direction in which the object deviates from the proper range by sound, if it is determined that the object is outside the proper range.

In the present invention, if an object such as the hand of a user deviates from a proper range, sound is used to inform the user of a direction in which the object deviates from the proper range. Therefore, the user can visually recognize the direction in which the object deviates from the proper range and can also easily and immediately correct the position of the object. Consequently, the user can easily recognize the proper range in a three-dimensional space and input a desired instruction or the like by performing gesture in the proper range.

According to still another aspect of the present invention, an object operation range presenting method in a user interface apparatus for performing input by image processing of an object comprises the steps of checking whether an object of image processing is in a proper range within which the image processing is possible, and presenting at least one of predetermined visual information and audio information when the object is outside the proper range.

According to still another aspect of the present invention, an object operation range presenting method in a user interface apparatus for performing input by image processing of an object comprises the steps of checking whether an object of image processing is in a proper range within which the image processing is possible and, if the object is outside the proper range, checking a direction in which the object deviates from the proper range, and informing a user of a direction in which the object deviates from the proper range by changing a display state of a cursor displayed on a display screen into a predetermined state, if it is determined that the object is outside the proper range.

According to still another aspect of the present invention, an object operation range presenting method in a user interface apparatus for performing input by image processing of an object comprises the steps of checking whether an object of image processing is in a proper range within which the image processing is possible and, if the object is outside the proper range, checking a direction in which the object deviates from the proper range, and informing a user of a direction in which the object deviates from the proper range by sound, if it is determined that the object is outside the proper range.

Note that the invention related to each of the above apparatuses can also be established as an invention related to a method.

Note also that each of the above inventions can be established as a mechanically readable medium recording programs for allowing a computer to execute a corresponding procedure or means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A through 4H are flow charts showing an example of the operation procedure of the user interface apparatus of the first embodiment;

FIGS. 11A and 11B are views showing examples of screen displays;

FIG. 20 is a view showing examples of descriptions of recognition engines for different objects;

FIGS. 34A and 34B are views showing examples of a dot matrix and a screen display, respectively, when an object is too close;

DETAILED DESCRIPTION OF THE INVENTION

Embodiments of the present invention will be described below with reference to the accompanying drawings.

The first embodiment will be described below.

Figure 1:
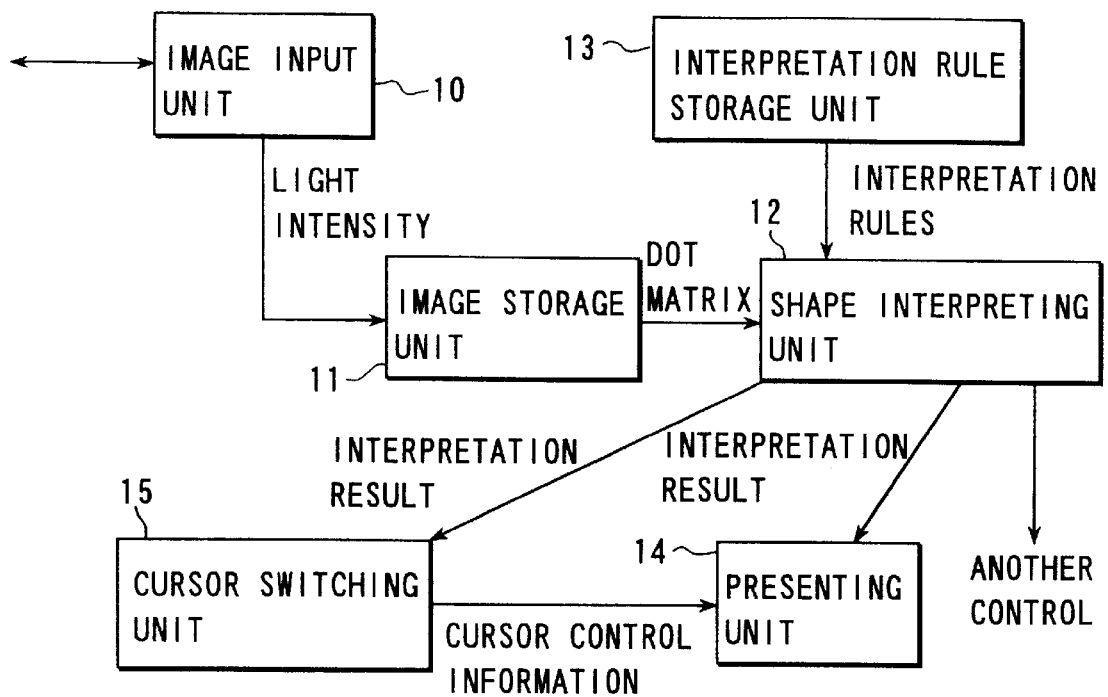
FIG. 1 is a block diagram showing an example of the arrangement of an interface apparatus according to the first embodiment of the present invention.

FIG. 1 is a block diagram showing the arrangement of a user interface apparatus according to the first embodiment of the present invention.

This user interface apparatus is suitably applicable to, e.g., a computer having a graphical user interface. That is, this apparatus is a system in which a cursor, a slider bar, a scroll bar, a pull-down menu, a box, a link, and icons of applications are displayed on the display screen, and a user inputs an instruction for moving a cursor, selecting an icon, or starting an application by using an input device. The input device receives inputs by performing image processing for an object such as the hand of a user without requiring any dedicated device such as a mouse.

Briefly, the apparatus of this embodiment receives reflected light from an object such as the hand of a user as an image (or receives background light reflected by an object as an image), detects information of the shape, motion, or distance of the object, and performs predetermined control (e.g., control relating to I/O devices or start of application software) in accordance with the shape or the like. That is, this embodiment provides a function by which a user can perform an intended input operation by, e.g., moving his or her hand. Also, modes such as a cursor move mode, an icon select mode, and an application start mode are switched in accordance with the image processing result. Therefore, the user need not perform any explicit operation of switching the modes.

This user interface apparatus includes an image input unit 10, an image storage unit 11, a shape interpreting unit 12, an interpretation rule storage unit 13, a presenting unit 14, and a cursor switching unit 15.

Figure 2:
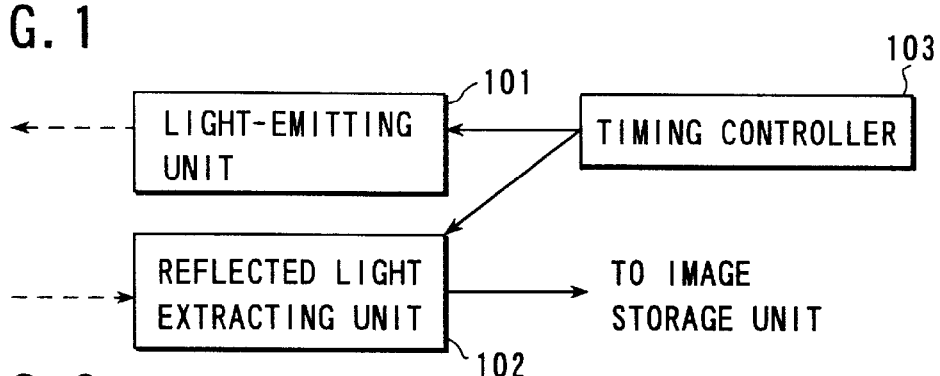
FIG. 2 is a block diagram showing an example of the arrangement of an image input unit.

FIG. 2 shows an example of the arrangement of the image input unit 10.

The image input unit 10 includes a light-emitting unit 101, a reflected light extracting unit 102, and a timing controller 103. The light-emitting unit 101 irradiates light such as near infrared rays onto an object by using light-emitting elements such as LEDs. The reflected light extracting unit 102 receives the reflected light from the object by using light-receiving elements arranged in the form of a two-dimensional array. The timing controller 103 controls the operation timings of the light-emitting unit 101 and the reflected light extracting unit 102. The difference between the amount of light received by the reflected light extracting unit 102 when the light-emitting unit 101 emits light and the amount of light received by the reflected light extracting unit 102 when the light-emitting unit 101 does not emit light is calculated to correct the background, thereby extracting only a component of the light emitted from the light-emitting unit 101 and reflected by the object. Note that the image input unit 10 need not have any light-emitting unit, i.e., can have only a light-receiving unit such as a CCD camera.

Figure 3:
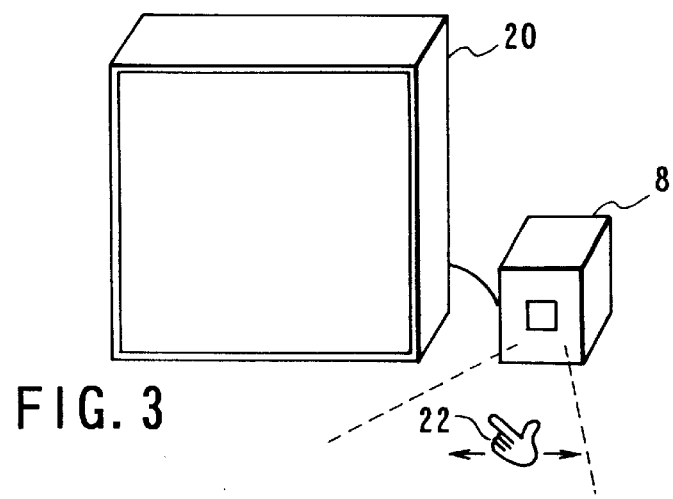
FIG. 3 is a view for explaining the relationship between a display device, the housing of the image input unit, and an object.
Figure 4A:
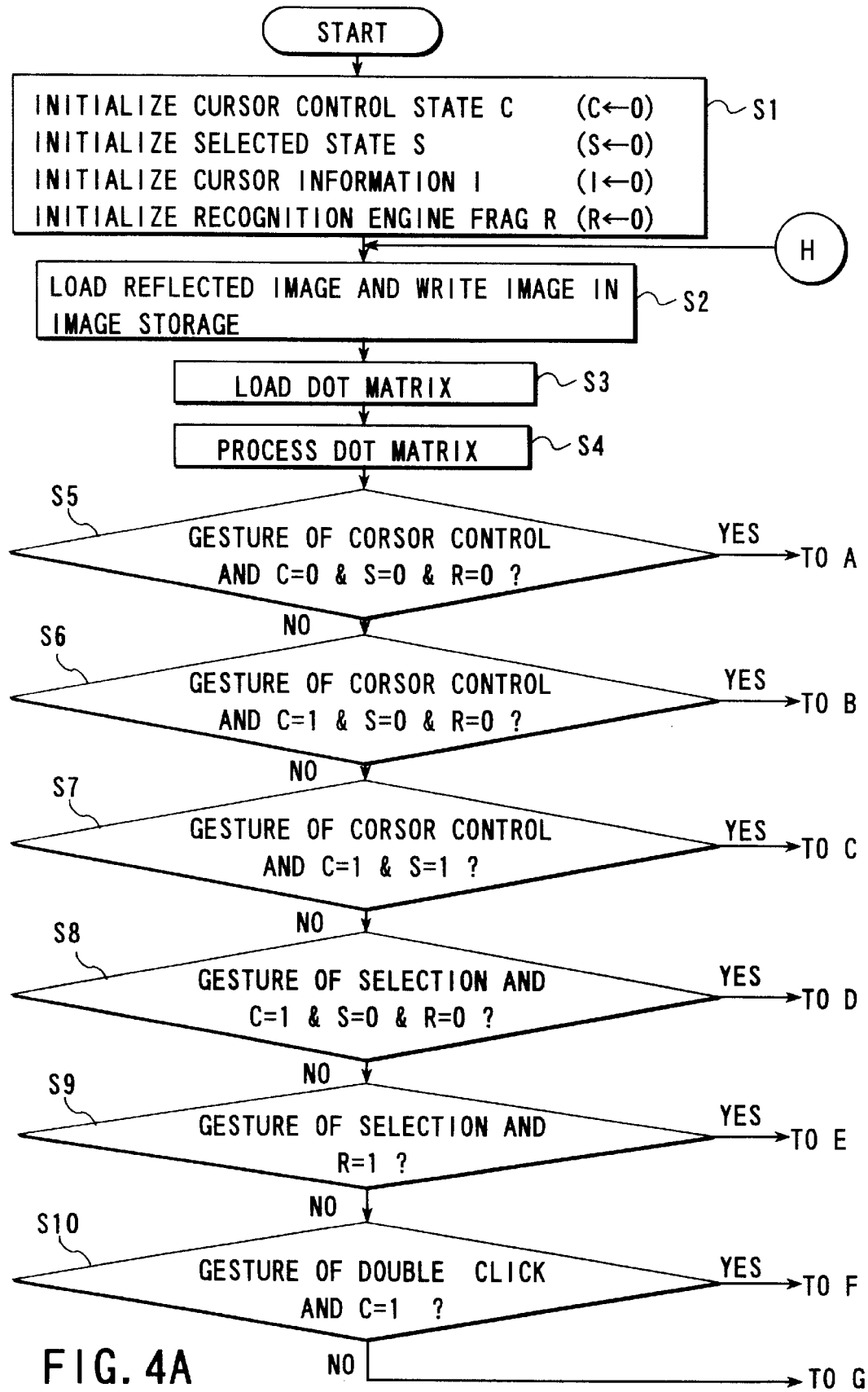

FIG. 3 shows the relationship between a display device 20, a housing 8 of the image input unit 10, and an object 22. For example, when a user puts a hand 22 before the image input unit 10, an image of the reflected light from the hand is obtained. Each pixel value of the reflected light image is affected by the property of the object (e.g., whether the object mirror-reflects, scatters, or absorbs light), the direction of the object surface, the distance to the object, and the like factor. However, if a whole object uniformly scatters light, the amount of the reflected light has a close relationship to the distance to the object. Since a hand has this property, the reflected light image when a user puts his or her hand before the image input unit reflects the distance to the hand, the inclination of the hand (the distance changes from one portion to another), and the like. Therefore, various pieces of information can be input and generated by extracting these pieces of information.

The image storage unit 11 sequentially stores two-dimensional images of an object of image detection, which are output at predetermined time intervals (e.g., 1/30, 1/60, or 1/100 sec) from the image input unit 10.

The shape interpreting unit 12 sequentially fetches, as N×N (e.g., 64×64) dot matrices, the two-dimensional images stored in the image storage unit 11. Note that each pixel has gradation levels (e.g., 8 bits=256 gradation levels).

Also, the shape interpreting unit 12 extracts a predetermined feature amount from a dot matrix and interprets the shape on the basis of the interpretation rules stored in the interpretation rule storage unit 13. The shape interpreting unit 12 outputs an instruction corresponding to a suitable interpretation rule as a interpretation result. If there is no suitable interpretation rule, it is also possible, where necessary, to change the way a predetermined feature amount is extracted from a dot matrix (e.g., change a threshold value when dot matrix threshold processing is performed) and again perform the matching processing. If no suitable interpretation rule is finally found, it is determined that there is no input.

The interpretation rule storage unit 13 stores interpretation rules for shape interpretation. For example, predetermined contents such as feature amounts, e.g., the shape, area, uppermost point, and the center of gravity of an object such as the hand of a user in a dot matrix and designation contents corresponding to these predetermined contents are stored as interpretation rules. The designation contents include, e.g., selection of an icon, start of an application, and movement of a cursor. When cursor movement is to be performed, the moving amount of a cursor corresponding to the direction and the distance of the movement of the hand is also designated. For example, the following rules are possible. That is, a state in which the thumb and the index finger are open and raised is used to indicate cursor movement (in this case, the distance and the direction of the movement of the tip of the index finger correspond to the distance and the direction of the movement of the cursor). A state in which the thumb and the index finger are closed and raised is used to indicate selection of an icon in a position where the cursor exists. A state in which the thumb and the index finger are raised and the palm of the hand is turned from that in the cursor movement is used to indicate start of an application corresponding to an icon in a position where the cursor exists. Examples of the stored rules in the interpretation rule storage unit 13 are as follows.

Select recognition engine: select engine
    direction: forward direction←a direction in which the thumb of the right hand is positioned on the leftmost side
    thumb: stretched←all joints of the finger are stretched
    index finger: stretched←all joints of the finger are stretched
    middle finger: bent←all joints of the finger are bent ring finger: bent←all joints of the finger are bent little finger: bent←all joints of the finger are bent Select recognition engine: execute engine IF immediately preceding selected engine: select engine←a condition is that an immediately preceding selected engine is a select engine rotational angle from immediately preceding selected engine: 180°←a condition is that a rotational angle from a select engine is 180° direction: reverse direction←a direction in which the thumb of the right hand is positioned on the rightmost side thumb: stretched←all joints of the finger are stretched index finger: stretched←all joints of the finger are stretched middle finger: bent ←all joints of the finger are bent ring finger: bent←all joints of the finger are bent little finger: bent←all joints of the finger are bent Representative examples of the extraction of a feature amount from a dot matrix in the shape interpretation by the shape interpreting unit 12 are distance information extraction and region extraction. If an object has a uniform homogeneous scattering surface, the reflected light image can be regarded as a distance image. Accordingly, the three-dimensional shape of the object can be extracted from the light-receiving unit. If the object is a hand, an inclination of the palm of the hand, for example, can be detected. The inclination of the palm of the hand appears as the difference between partial distances. If pixel values change when the hand is moved, it can be considered that the distance changes. Also, almost no light is reflected from a far object such as a background. Therefore, in processing of cutting out a region having a certain threshold value or more from a reflected light image, the shape of an object can be easily cut out. If the object is a hand, for example, it is very easy to cut out the silhouette image of the hand. Even when a distance image is used, a general approach is to once perform region extraction by using a threshold value and then use distance information in the region.

Various methods are usable as a method of matching a feature amount extracted from a dot matrix with the interpretation rules. Examples are vector formation by which a vector is extracted from an image, extraction of a shape deformed state based on a shape model, and spectral analysis based on a distance value on a scan line.

If there is no suitable shape, the matching processing can be reexecuted by changing the threshold value or the like. If no suitable shape is finally found, it is determined that there is no input.

If the shape interpreting unit 12 determines that an instruction is for starting the function of an application or an OS, the corresponding software is started.

The presenting unit 14 performs presentation reflecting the interpretation result from the shape interpreting unit 12 on the display device. For example, the movement of a cursor and, where necessary, messages are presented.

The cursor switching unit 15 controls cursor switching on the basis of the interpretation result from the shape interpreting unit 12.

FIGS. 4A through 4H show an example of the operation procedure of the user interface apparatus of this embodiment.

First, a cursor control state C is initialized (C←0), a selected state S is initialized (S←0), cursor information I is initialized (I←0), and a recognition engine flag R is initialized (R←0) (step S1).

Next, a reflected image is written in the image storage unit 11 (step S2).

A dot matrix is loaded to the shape interpreting unit 12 (step S3).

Subsequently, the shape interpreting unit 12 checks a mode indicated by gesture from a feature amount extracted from the dot matrix and the interpretation rules (step S4).

Thereafter, the processing branches in accordance with the determination result and the parameter values.

If the gesture indicates cursor control and the parameters are C=0, S=0, and R 32 0 (step S5), the processing is cursor control. Therefore, C=1 is set (step S11), and the flow returns to step S2.

Figure 5:
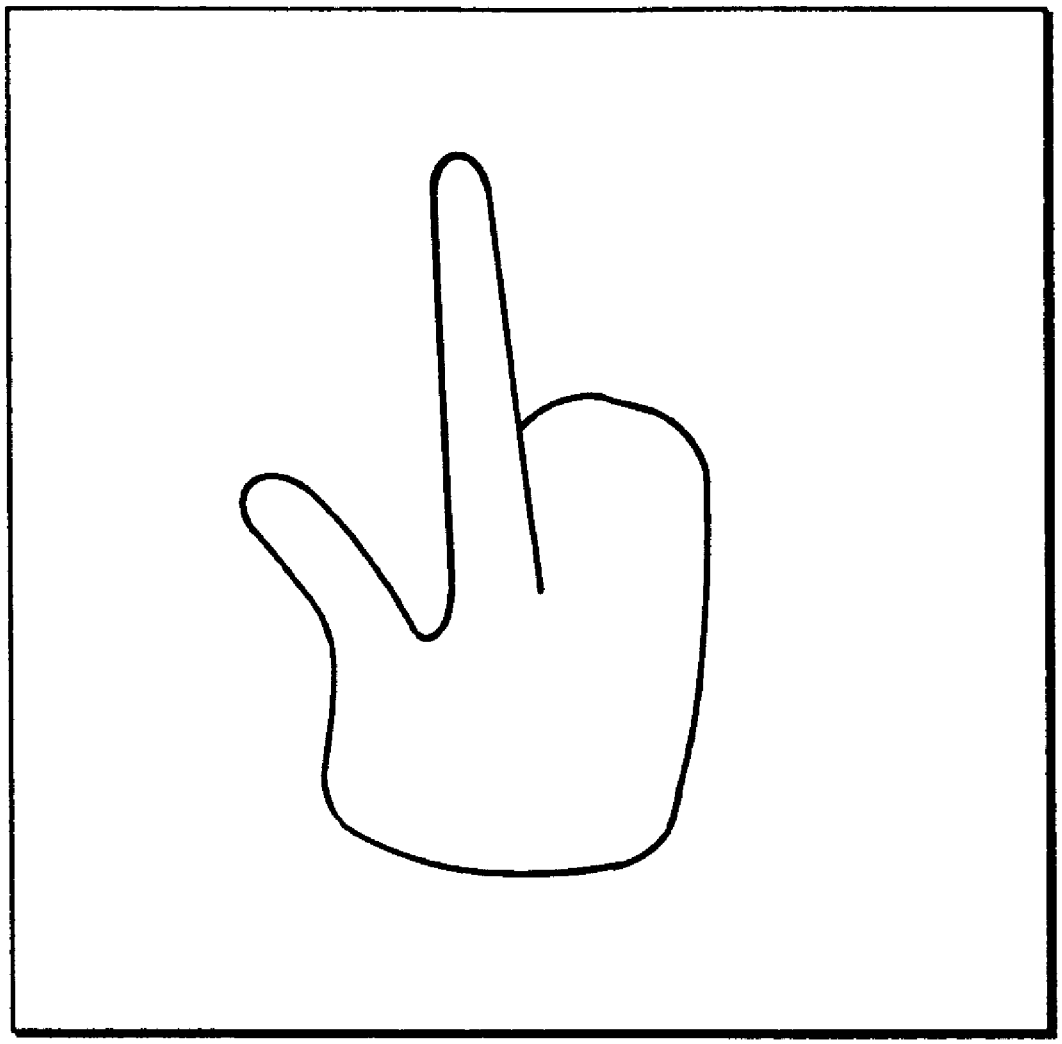
FIG. 5 is a view showing an example of an input image which indicates gesture for cursor control.

The gesture indicating cursor control is detected when, for example, the shape of a hand shown in FIG. 5 is recognized. That is, the gesture is detected when the thumb and the index finger of the right hand are open and raised upward.

If the gesture indicates cursor control and the parameters are C=1, S=0, and R=0 (step S6), the processing is cursor movement. If this is the case, coordinates (x,y) of a close point are calculated from the dot matrix (step S12), and the cursor is moved to the calculated coordinates (x,y) (step S13). The calculated coordinates (x,y) are held. Cp=(x,y) is set (step S14). If an object exists in Cp (step S15), the state of the object is set (I←object state) (step S16). If there is no object (step S15), I=0 is set (step S17), and the flow returns to step S2.

If the gesture indicates cursor control and the parameters are C=1 and S=1, the processing is returned to cursor control. Therefore, S∂0, R←0, and I←0 are set (step S18), and the flow returns to step S2.

If the gesture indicates selection and the parameters are C=1, S=0, and R=0 (step S8), the processing is selection of an object. If this is the case, S←1 is set (step S19), an object closest to Cp is searched (step S20), and the searched object is selected (step S21). If the selected object has a designated recognition engine (step S22), R←1 is set (step S23), and the flow returns to step S2. If the selected object has no designated recognition engine and is a link object (step S24), the flow jumps to the link destination (step S25), C←0, S←0, and I←0 are set (step S26), and the flow returns to step S2. If the selected object is not a link object (step S24), the flow immediately returns to step S2.

Figure 9:
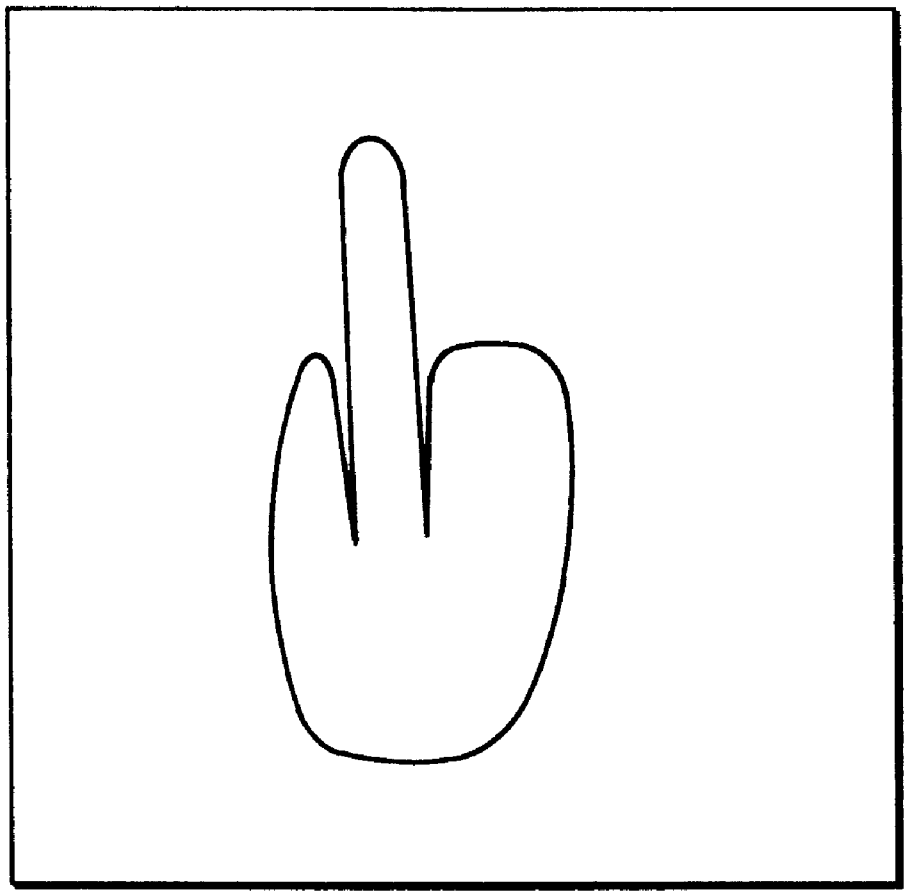
FIG. 9 is a view showing an example of an input image which indicates gesture for selection.

The gesture indicating selection is detected when, for example, the shape of a hand shown in FIG. 9 is recognized. That is, the gesture is detected when the thumb and the index finger of the right hand are closed and raised upward.

A recognition engine is for extracting a predetermined feature amount from a dot matrix as will be described in detail later, and various recognition engines are usable. One example is an uppermost point vertical direction engine which extracts the vertical moving amount of the uppermost point of an object shape in a dot matrix.

If the gesture indicates selection and R=1 (step S9), the processing is movement of the selected object. Therefore, recognition meeting the object to be recognized is performed (step S27), and the flow returns to step S2.

If the gesture indicates double click (execution) and C=1 (step S10), the processing is double click. If this is the case, an object closest to Cp is open (step S28), C←0, S←0, I←0, and R←0 are set (step S29), and the flow returns to step S2.

Figure 12:
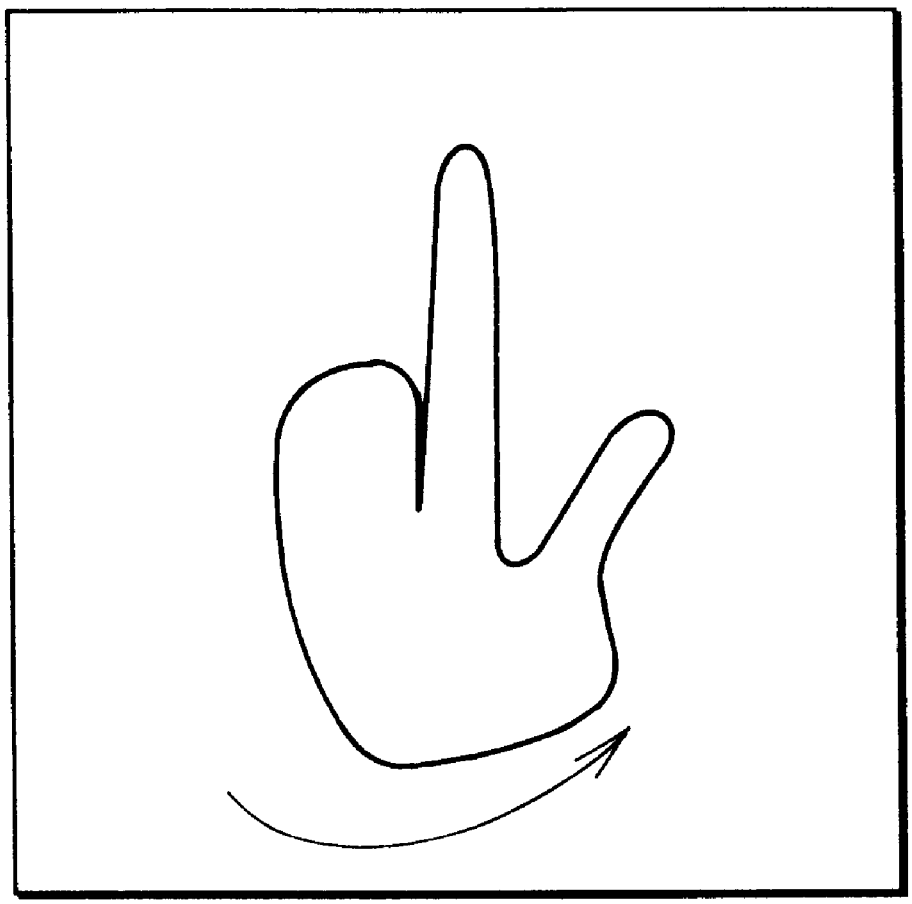
FIG. 12 is a view showing an example of an input image which indicates gesture for double click.

The gesture indicating double click is detected when, e.g., the shape of a hand shown in FIG. 12 is recognized. That is, the gesture is detected when the thumb and the index finger of the left hand are open and raised upward.

In other cases than described above, another recognition processing is performed (step S30), and the flow returns to step S2.

This embodiment will be described below by way of its practical example.

First, assume that cursor movement is designated when the shape of a hand in which the thumb and the index finger are stretched as shown in FIG. 5 is recognized.

Figure 6A:
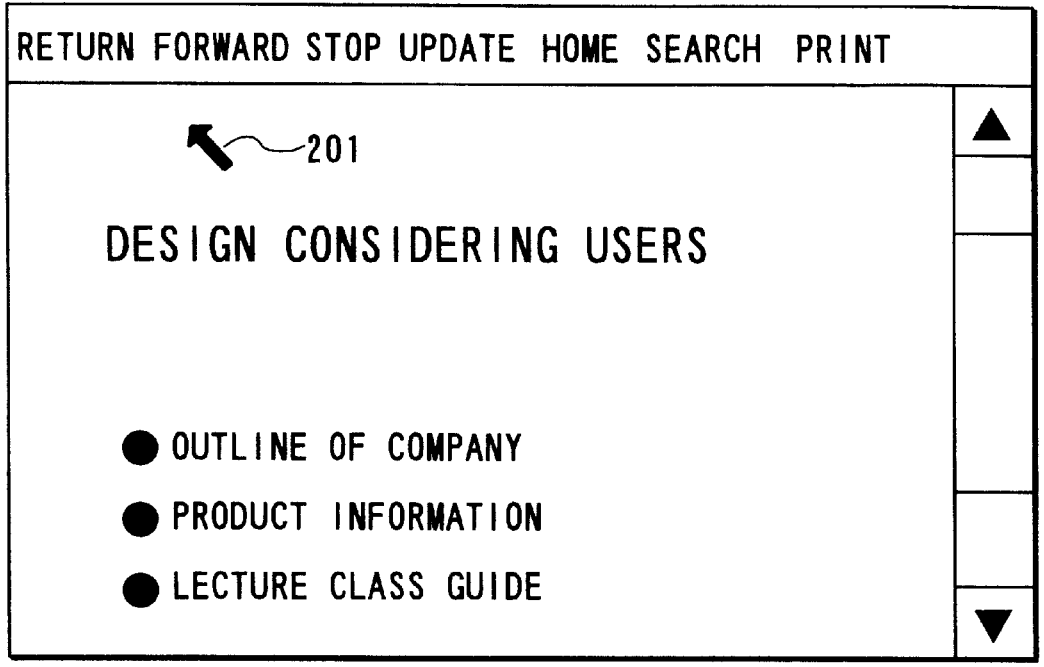
FIGS. 6A and 6B are views showing examples of screen displays.

If the hand shape in FIG. 5 is recognized in a state shown in FIG. 6A and the user moves the hand in the state shown in FIG. 5, a cursor 201 moves on the display screen accordingly. If this is the case, the amount and direction of the movement in a fixed point in a dot matrix of the user's hand shape, e.g., an uppermost point (e.g., the tip of the index finger) which is in the uppermost position in the vertical direction in the image or a nearest point (e.g., a point with the highest gradation level) which is nearest to the light-receiving unit in the image are extracted.

Figure 6B:
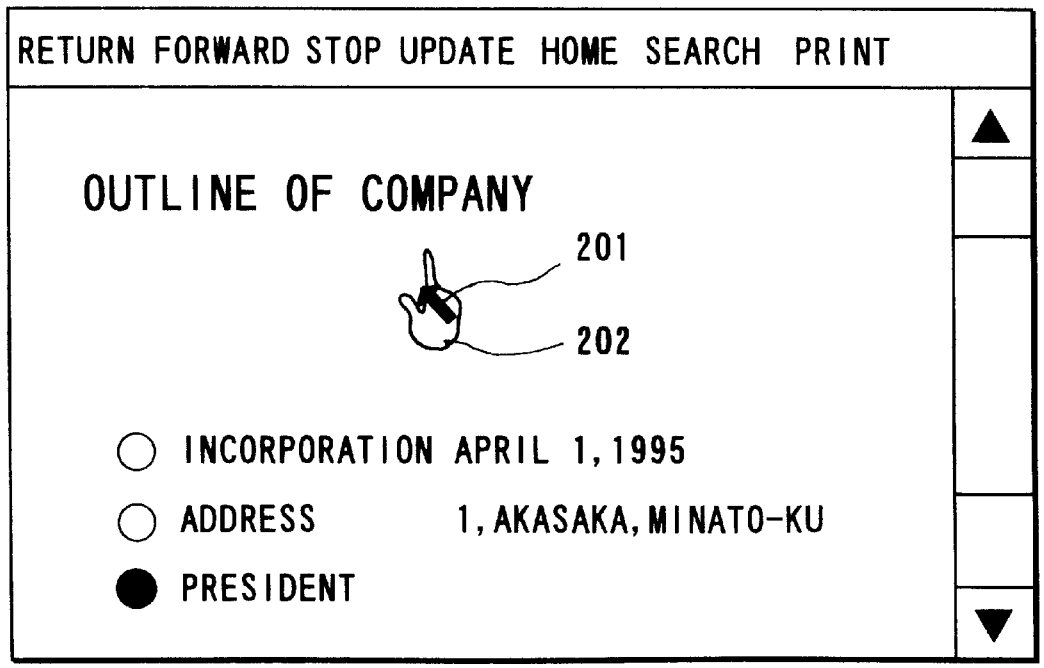

Note that as shown in FIG. 6B, it is also possible to display a semitransparent input image 202 on the cursor 201 to feed the recognition state back to the user.

If the cursor exists on an object such as a slider bar or a link node, the shape of the cursor is so changed as to present the function of the object.

Figure 7A:
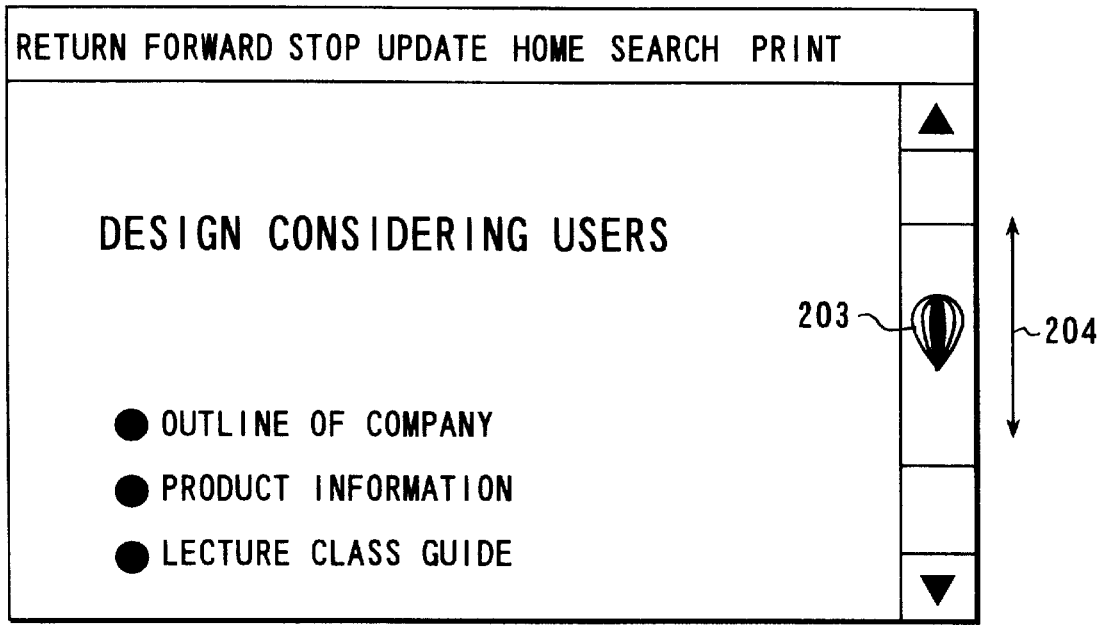
FIGS. 7A and 7B are views showing examples of screen displays.
Figure 7B:
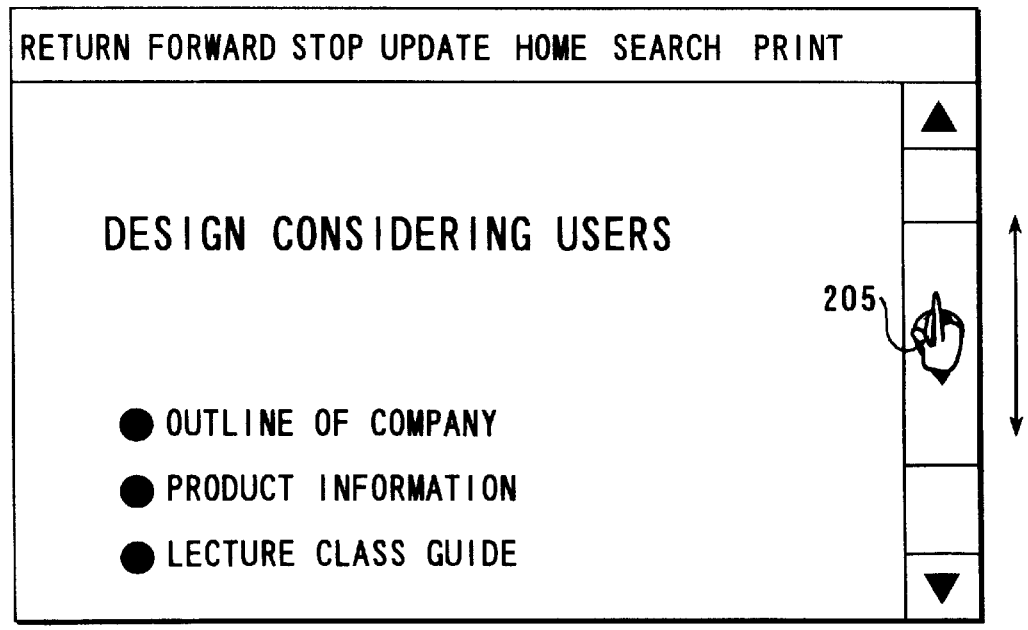

For example, if the cursor moves to a slider bar as shown in FIG. 7A, the shape of the cursor is changed as indicated by reference numeral 203. Note that a semitransparent input image 205 can also be displayed on the cursor as shown in FIG. 7B.

An arrow 204 in FIG. 7A indicates that an operation of the slider bar as an object to be operated is limited in the vertical direction. That is, a vertical direction engine is designated for the slider bar. If this is the case, only vertical movement is recognized regardless of how the user moves his or her hand.

Figure 8A:
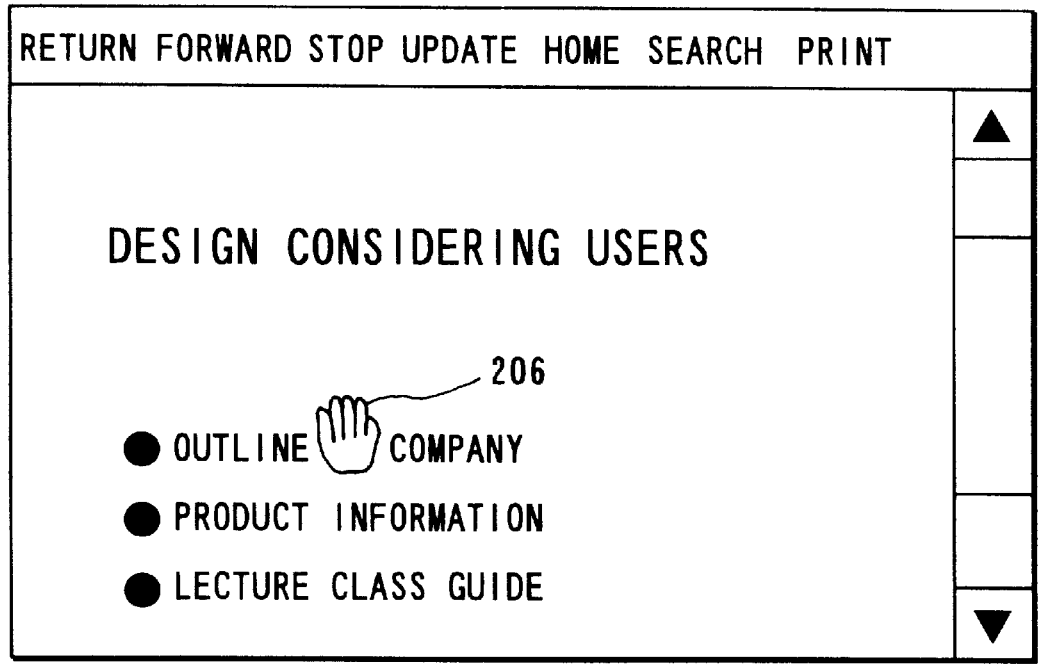
FIGS. 8A and 8B are views showing examples of screen displays.
Figure 8B:
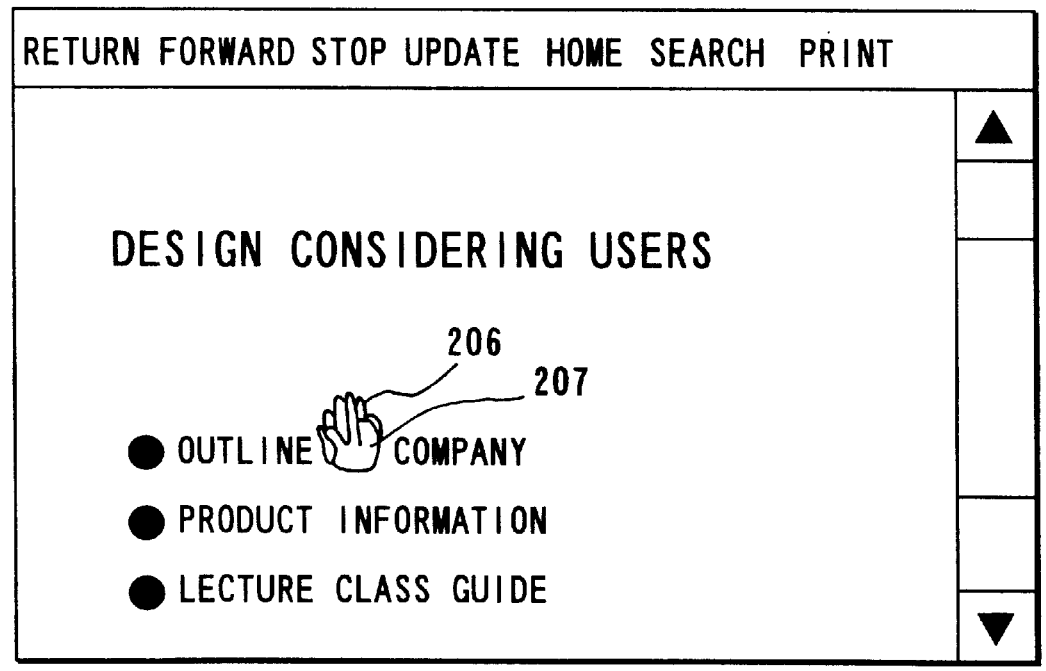

Also, if the cursor moves to a link node as shown in FIG. 8A, the shape of the cursor is deformed as indicated by reference numeral 206. Note that a semitransparent input image 207 can also be displayed on the cursor as shown in FIG. 8B.

After the cursor is moved to a desired position by the shape of the hand shown in FIG. 5, if the shape of a hand in which the index finger is stretched and the thumb is bent as shown in FIG. 9 is recognized, this means that selection of an object indicated by the cursor is designated. This is equivalent to single click of a mouse.

Figure 10A:
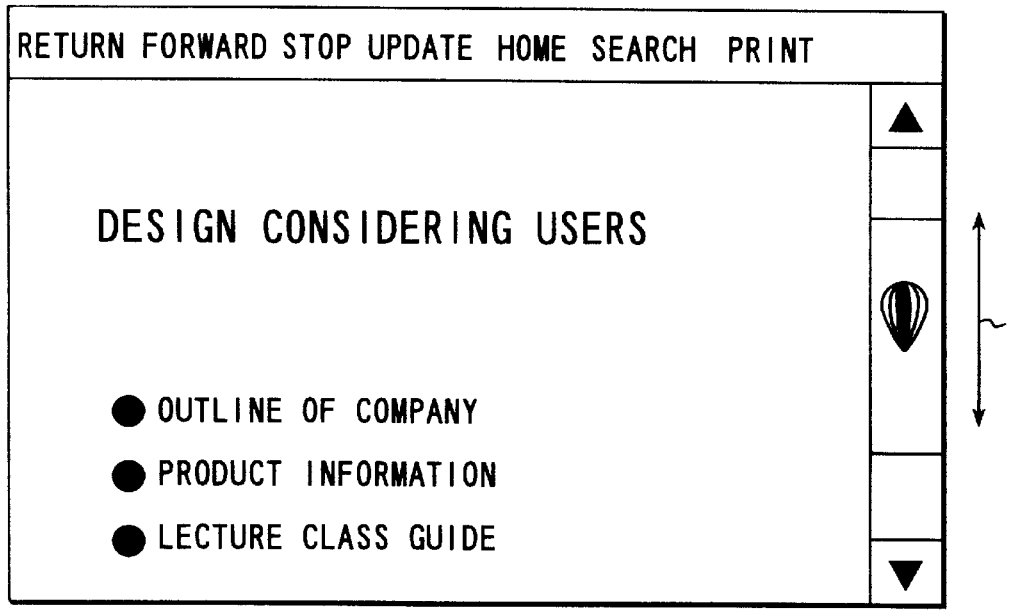
FIGS. 10A and 10B are views showing examples of screen displays.
Figure 10B:
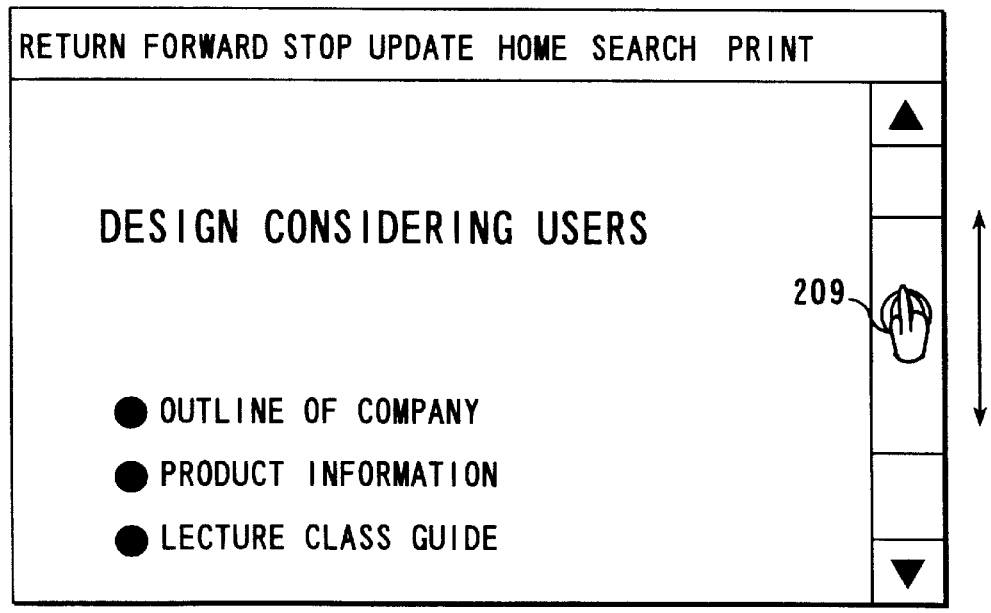

For example, if the shape of the hand in FIG. 9 is recognized in a state as shown in FIG. 10A, a slider bar is selected. An arrow 208 in FIG. 10A indicates that an operation of the slider bar as an object to be operated is limited in the vertical direction. Note that a semitransparent input image 209 can also be displayed on the cursor as shown in FIG. 10B.

Figures 11A, 11B:
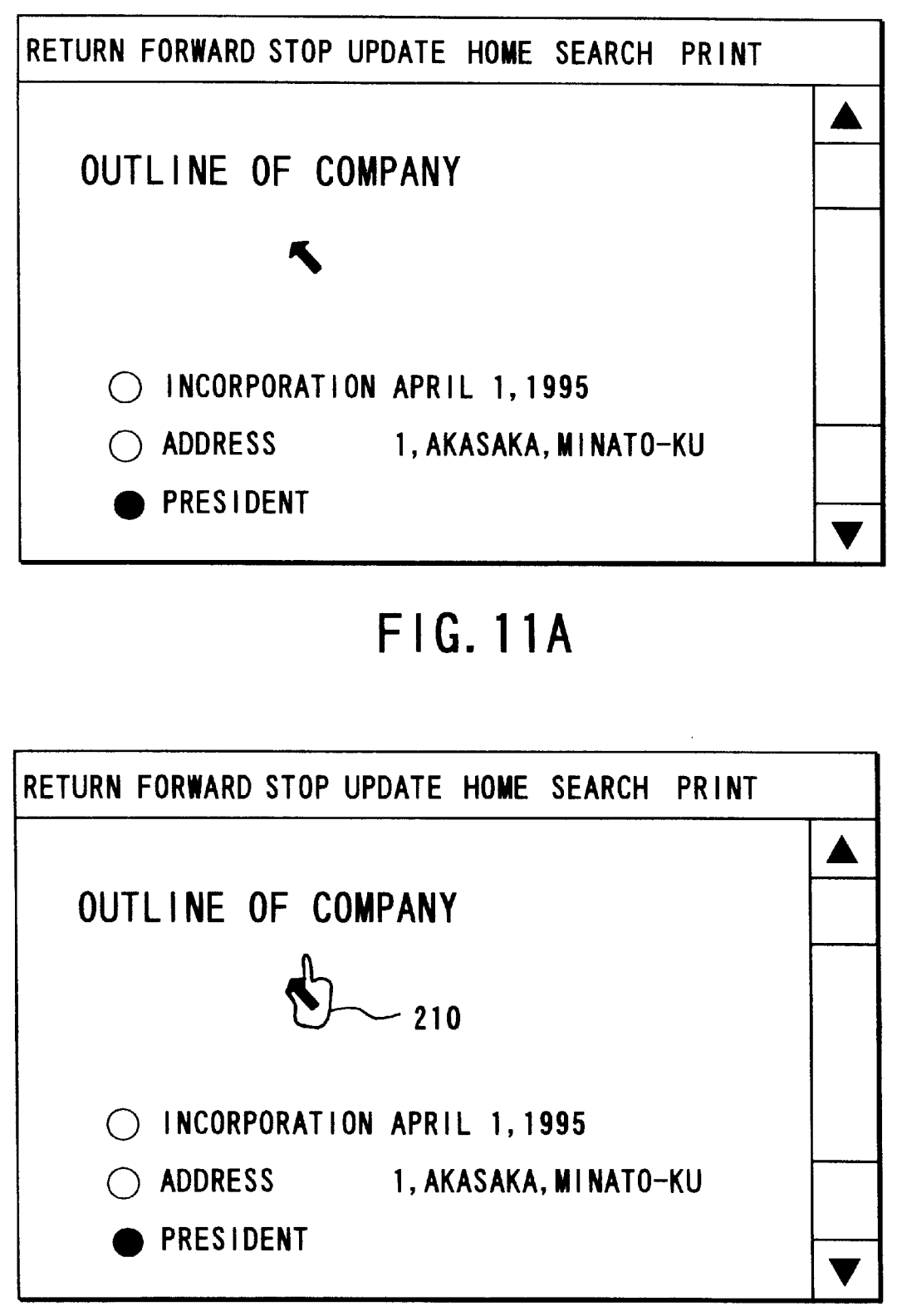

If the shape of the hand in FIG. 9 is recognized in the state shown in FIG. 8A, a link node "OUTLINE OF COMPANY" is selected, and the display contents are changed as shown in FIG. 11A. Note that a semitransparent input image 210 can also be displayed on the cursor as shown in FIG. 11B.

After the cursor is moved to a desired position by the shape of the hand shown in FIG. 5, if the same hand shape except that the wrist is turned approximately 180° as shown in FIG. 12 is recognized, this means that double click of an object indicated by the cursor is designated.

Figure 13A:
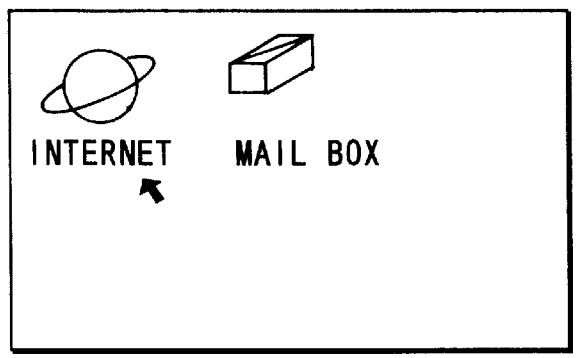
FIGS. 13A and 13B are views showing examples of screen displays.
Figure 13B:
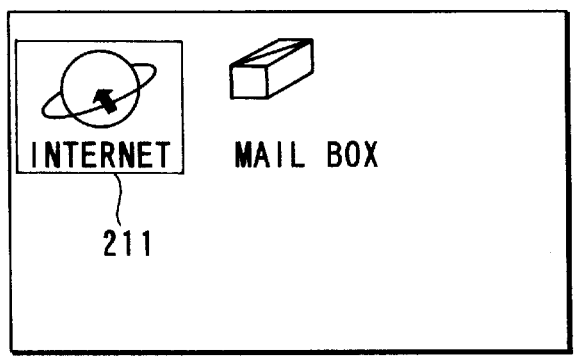
Figure 14:
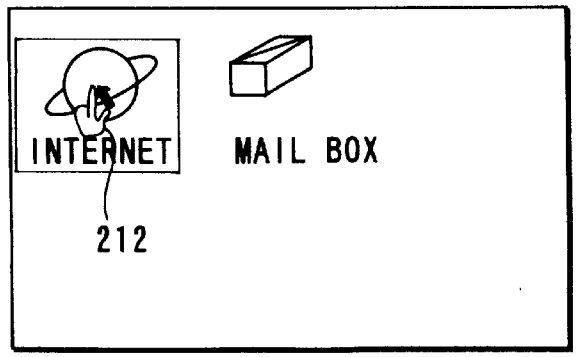
FIG. 14 is a view showing an example of a screen display.

In FIG. 13A, for example, the cursor is moved onto an icon "INTERNET" with the shape of the hand shown in FIG. 5, and subsequently the hand is turned almost 180° as shown in FIG. 12. Consequently, double click of "INTERNET" is accepted. FIG. 13B shows a state immediately before the selected icon is open. Note that a semitransparent input image 212 can also be displayed on the cursor as shown in FIG. 14.

Figure 15A:
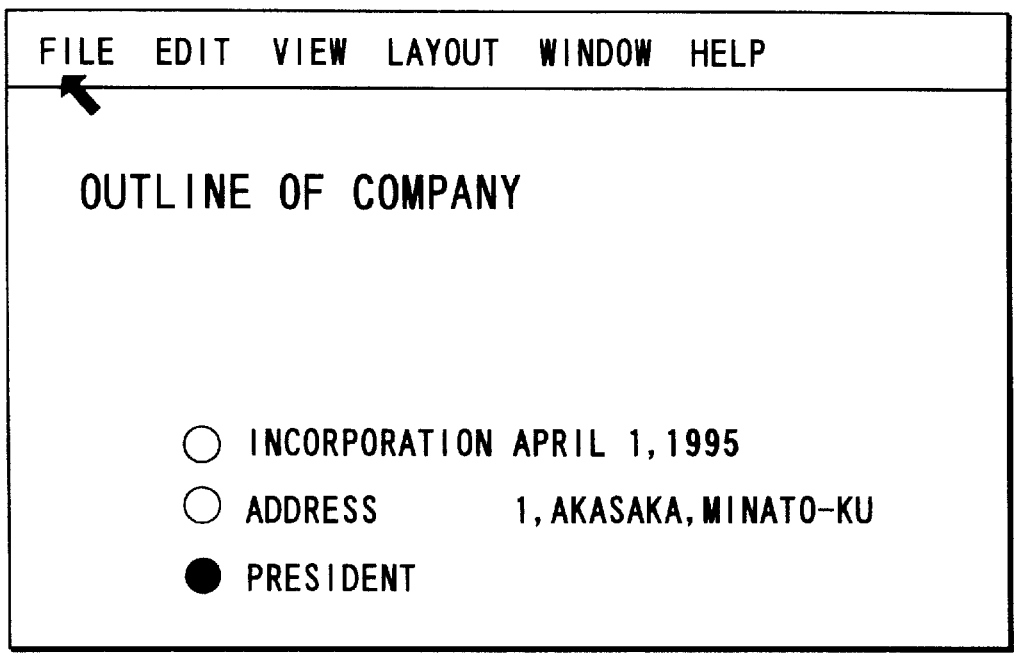
FIGS. 15A and 15B are views showing examples of screen displays.
Figure 15B:
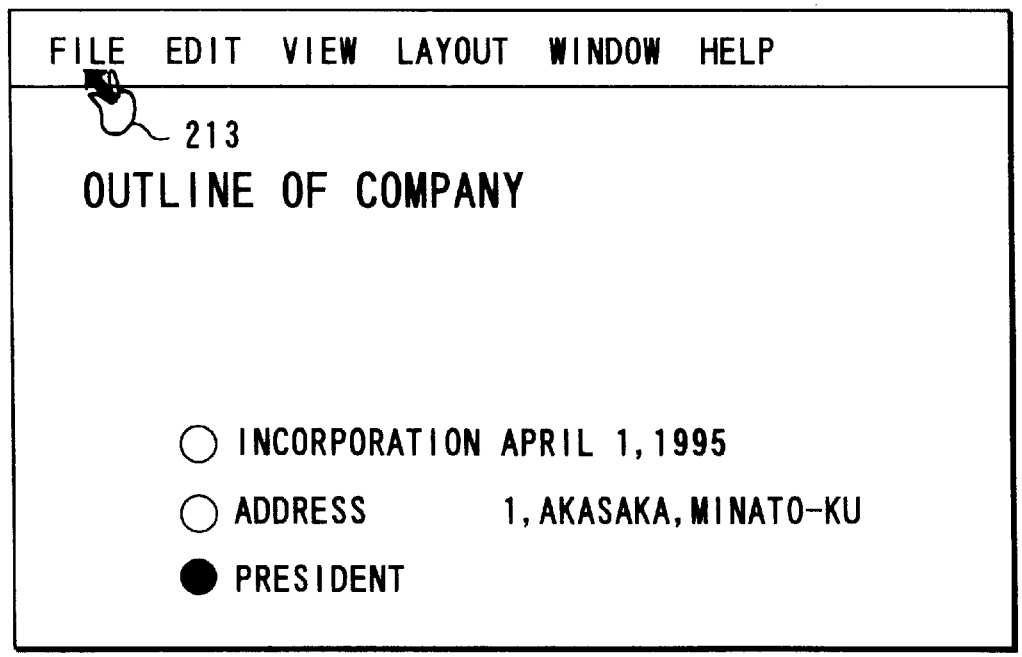

Also, for example, the cursor is moved to "FILE" as shown in FIG. 15B. At this time, a semitransparent input image 213 can also be displayed on the cursor as shown in FIG. 15B.

Figure 16A:
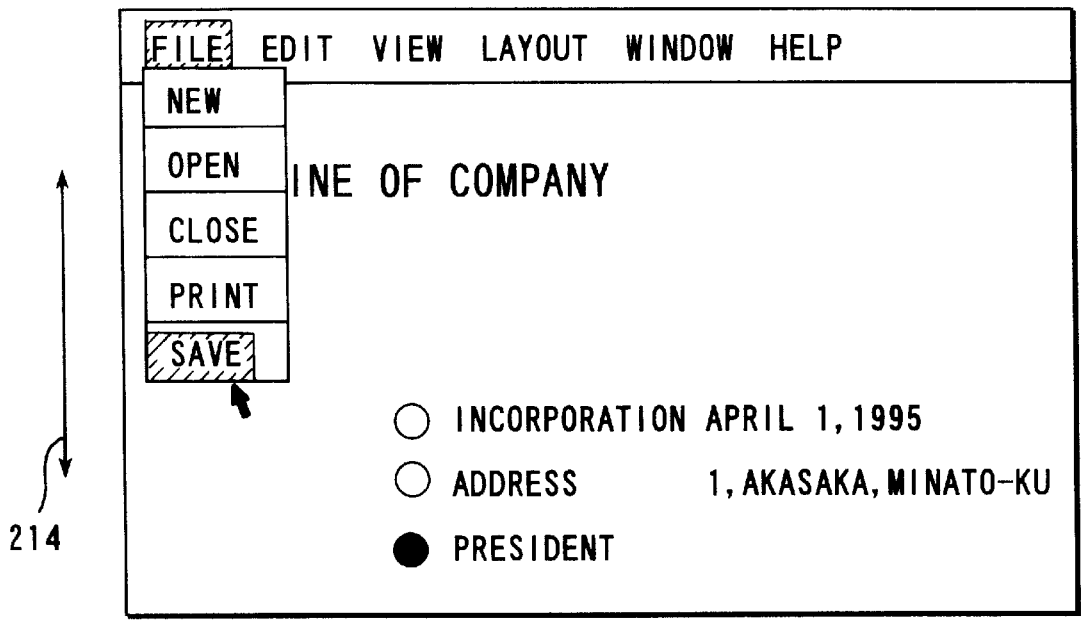
FIGS. 16A and 16B are views showing examples of screen displays.

When "FILE" is selected, a pull-down menu is displayed as shown in FIG. 16A. An arrow 214 indicates that an operation of the pull-down menu as an object to be operated is limited in the vertical direction.

Figure 16B:
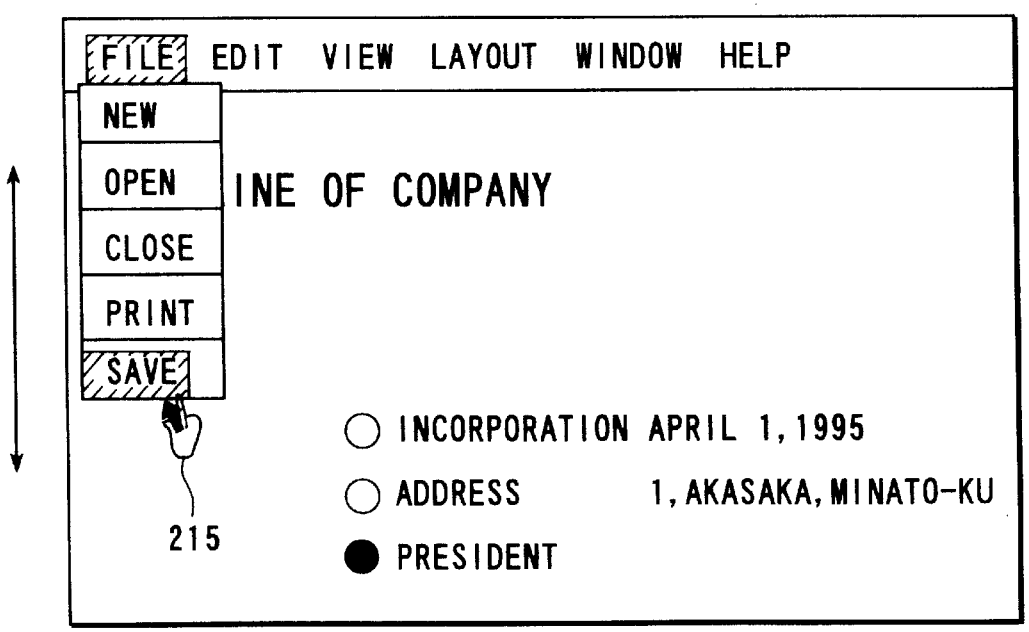

When the cursor is moved onto "SAVE" as shown in FIG. 16A and the hand is turned almost 180° as shown in FIG. 12, double click of "SAVE" is accepted. As in the above operations, a semitransparent input image 213 can also be displayed on the cursor as shown in FIG. 16B.

Figure 17A:
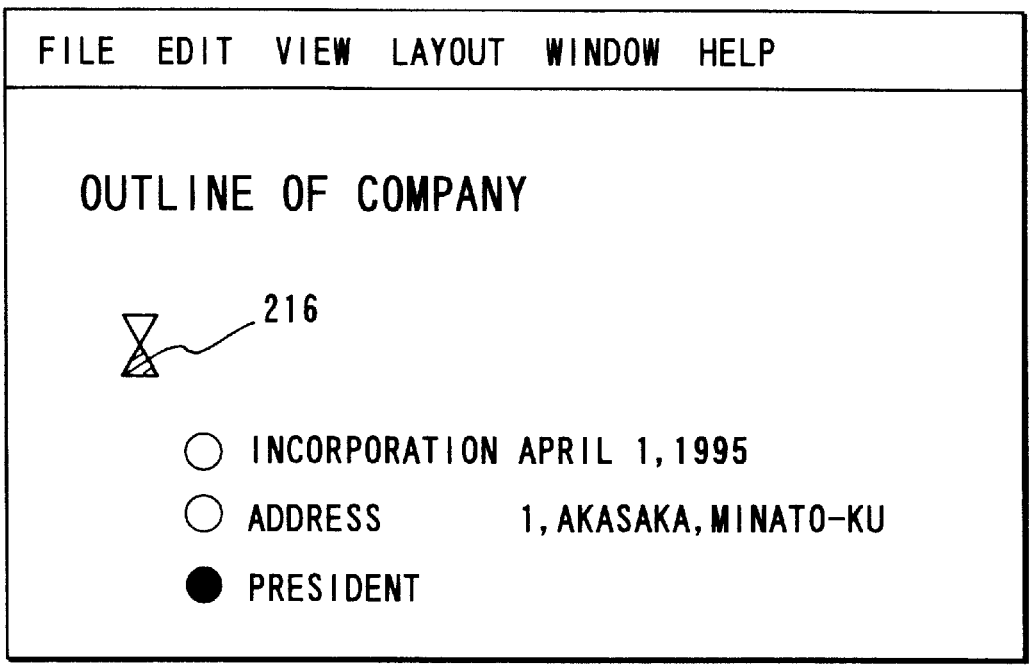
FIGS. 17A and 17B are views showing examples of screen displays.
Figure 17B:
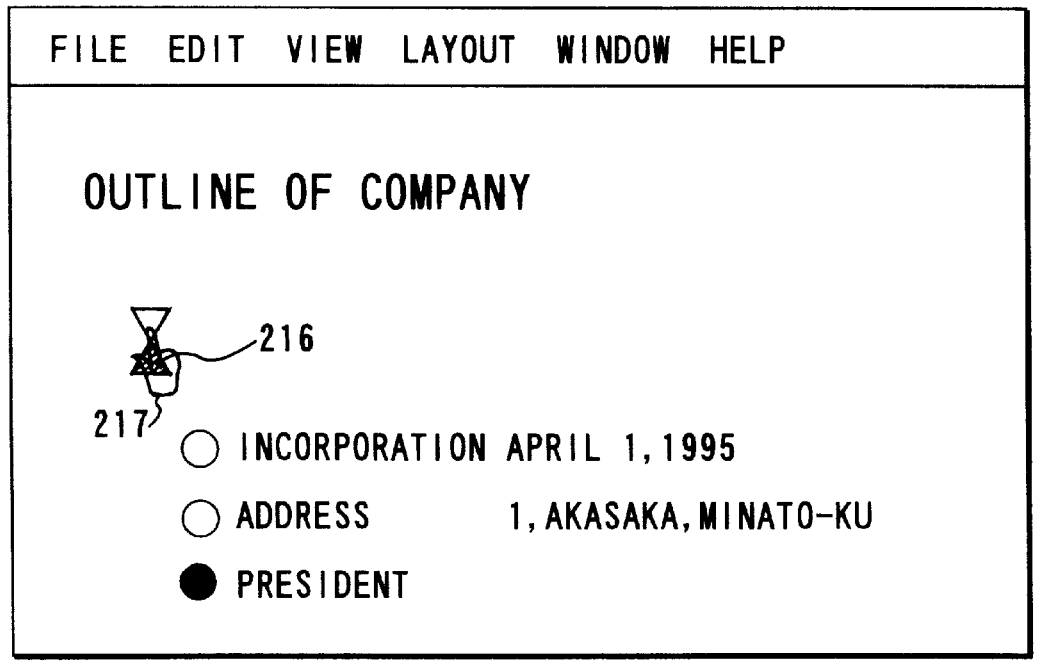

When "SAVE" is double-clicked, the shape of the cursor is deformed as indicated by reference numeral 216 in FIG. 17A. This indicates an operation of saving a document is being executed by the selection of save. As in the above operations, a semitransparent input image 217 can also be displayed on the cursor as shown in FIG. 17B.

Figure 18A:
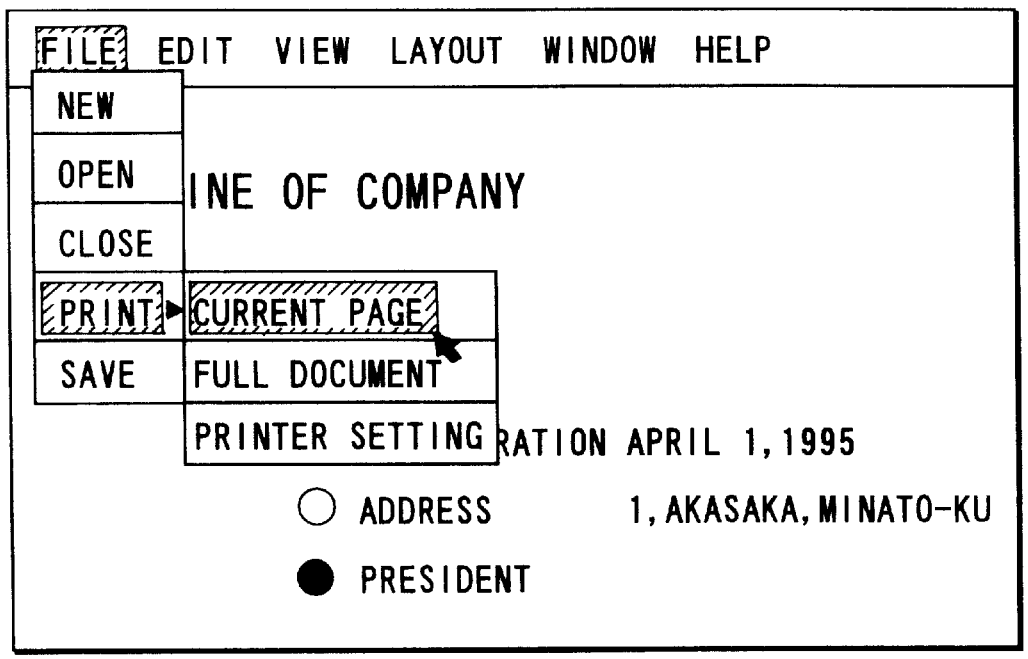
FIGS. 18A and 18B are views showing examples of screen displays.
Figure 18B:
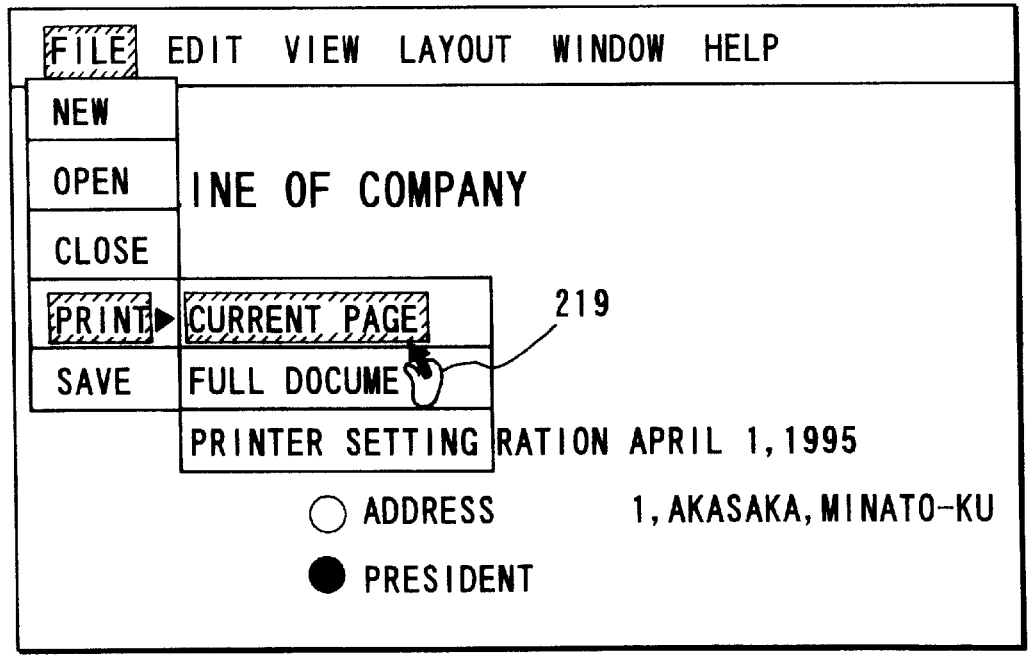

When, for example, the cursor is moved to "FILE" to select "FILE" and then moved to "PRINT" to select "PRINT" as shown in FIG. 18A, a menu corresponding to "PRINT" is displayed. At this time, a semitransparent input image 219 can also be displayed on the cursor as shown in FIG. 18B.

A recognition engine will be described below.

Figure 19:
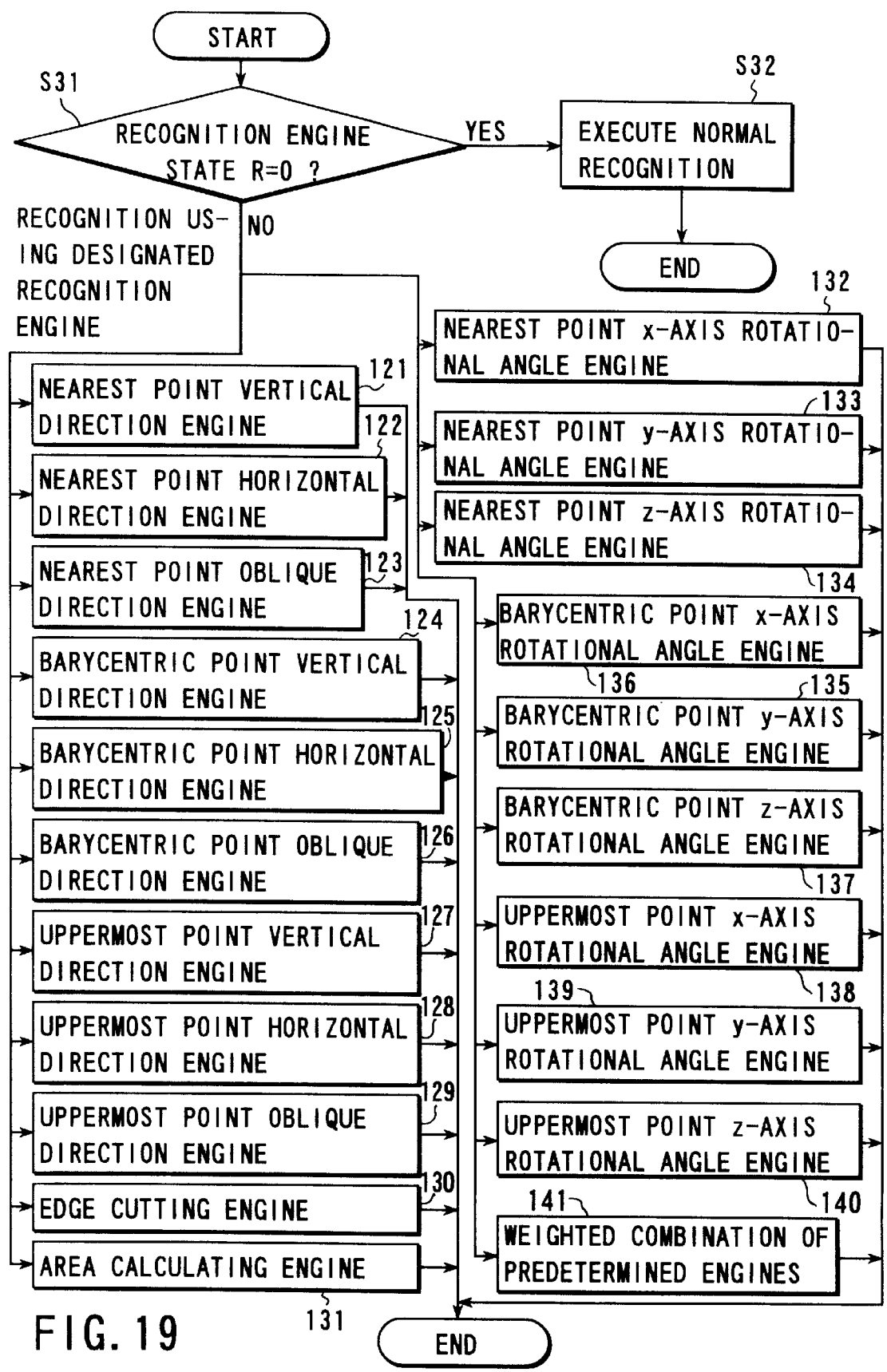
FIG. 19 is a view for explaining processing corresponding to a designated recognition engine.

FIG. 19 is a flow chart of processing concerning a recognition engine.

In this embodiment, a recognition engine is designated for each object where necessary. For example, this designation can be performed by programming by a programmer who forms an application program by using the present invention.

A recognition engine extracts a predetermined feature amount from a dot matrix. That is, if there is a recognition engine designated by a selected object (step S31), the shape interpreting unit 12 extracts a feature amount from a dot matrix in accordance with the designated recognition engine. If there is no designated recognition engine (step S31), the shape interpreting unit 12 executes normal recognition (step S32).

Various recognition engines are usable. Examples are a nearest point vertical direction engine 121 for extracting a vertical moving amount of a nearest point of an object shape in a dot matrix, a nearest point horizontal direction engine 122 for extracting a horizontal moving amount of the nearest point, a nearest point oblique direction engine 123 for extracting an oblique moving amount of the nearest point, a barycentric point vertical direction engine 124 for extracting a vertical moving amount of a barycentric point, a barycentric point horizontal direction engine 125 for extracting a horizontal moving amount of the barycentric point, a barycentric point oblique direction engine 126 for extracting an oblique moving amount of the barycentric point, an uppermost point vertical direction engine 127 for extracting a vertical moving amount of an uppermost point, an uppermost point horizontal direction engine 128 for extracting a horizontal moving amount of the uppermost point, an uppermost point oblique direction engine 129 for extracting an oblique moving amount of the uppermost point, an edge cutting engine 130 for cutting out the edge of an object shape in a dot matrix, an area calculating engine 131 for calculating the area of an object shape in a dot matrix, a nearest point x-axis rotational angle engine 132 for extracting a rotational angle around the x-axis of a nearest point of an object shape in a dot matrix, a nearest point y-axis rotational angle engine 133 for extracting a rotational angle around the y-axis of the nearest point, a nearest point z-axis rotational angle engine 134 for extracting a rotational angle around the z-axis of the nearest point, a barycentric point x-axis rotational angle engine 135 for extracting a rotational angle around the x-axis of a barycentric point, a barycentric point y-axis rotational angle engine 136 for extracting a rotational angle around the y-axis of the barycentric point, a barycentric point z-axis rotational angle engine 137 for extracting a rotational angle around the z-axis of the barycentric point, an uppermost point x-axis rotational angle engine 138 for extracting a rotational angle around the x-axis of an uppermost point, an uppermost point y-axis rotational angle engine 139 for extracting a rotational angle around the y-axis of the uppermost point, an uppermost point z-axis rotational angle engine 140 for extracting a rotational angle around the z-axis of the uppermost point, and a recognition engine 141 obtained by weighting and combining predetermined engines.

FIG. 20 shows examples of descriptions of recognition engines for different objects.

This embodiment as described above obviates the need for an explicit operation performed by a user to switch modes such as a cursor move mode, a select mode, and a double click mode.

Also, the embodiment eliminates the need for calibration done by an operation by a user because a point designated by the user is read by recognition processing and reflected on, e.g., cursor movement on the screen.

Furthermore, the input accuracy and the user operability can be expected to be improved by the use of a recognition engine.

Additionally, the operation state can be fed back to a user by superposing a semitransparent input image on a cursor.

As described above, this embodiment can provide a user interface apparatus which reduces the operation load on a user and is easier to use.

The second embodiment will be described next.

The second embodiment is basically the same as the first embodiment except that a part of recognition processing is performed inside an image input unit (to be referred to as a device side hereinafter) and an image input unit 10 transfers a dot matrix of an input image and a predetermined recognition result to the main body. Note that the recognition processing performed on the device side is desirably light-load processing.

Figure 21:
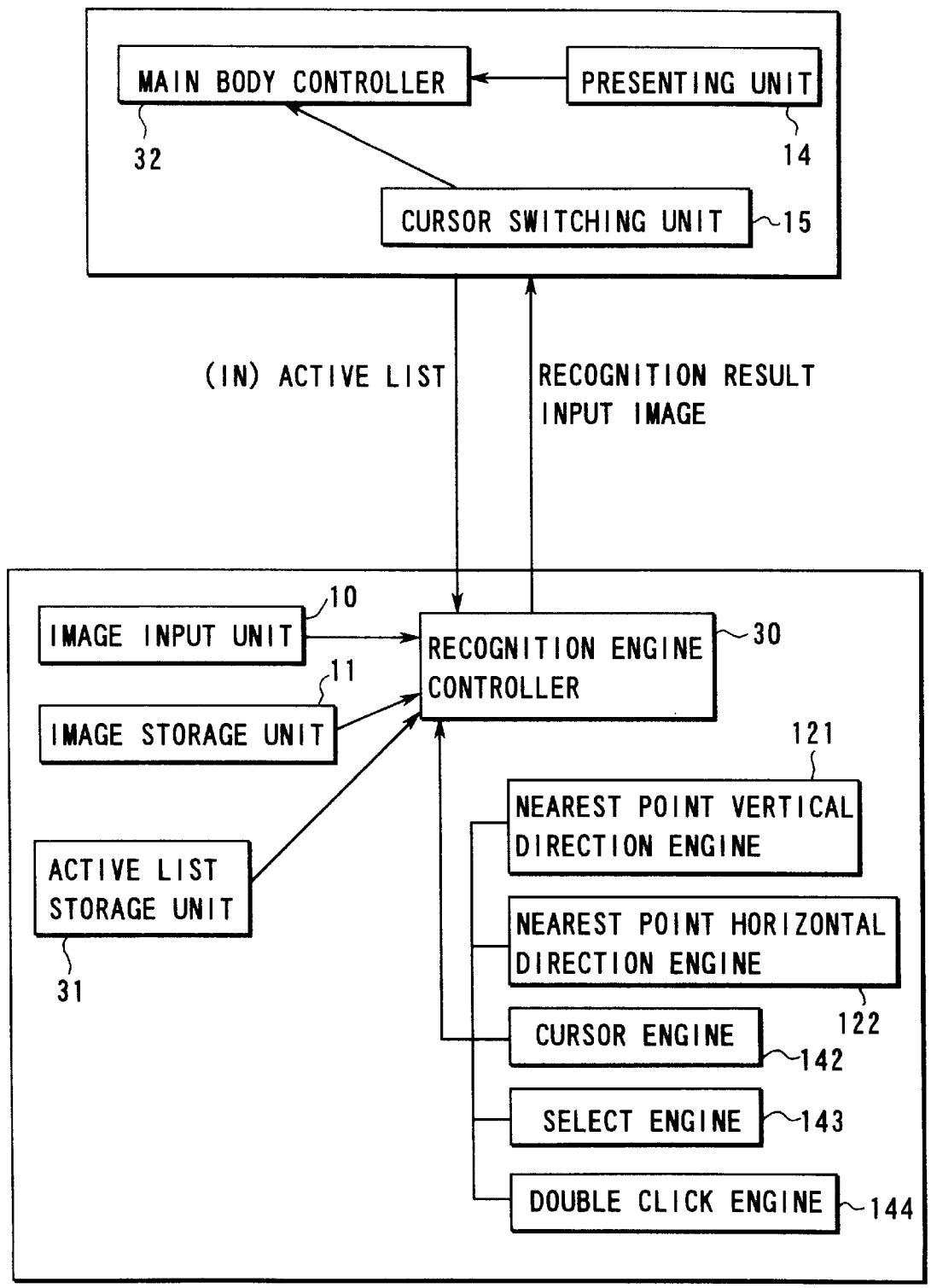
FIG. 21 is a block diagram showing an example of the arrangement of an interface apparatus according to the second embodiment of the present invention.

FIG. 21 shows an example of the arrangement of an interface apparatus according to this embodiment.

Referring to FIG. 21, the main body incorporates a main body controller 32, a presenting unit 14, and a cursor switching unit 15, and the device side incorporates the image input unit 10, an image storage unit 11, a recognition engine controller 30, an active list 31, and several predetermined recognition engines 121, 122, 142, 143, and 144.

The main body controller 32 corresponds to the shape interpreting unit 12 and the interpretation rule storage unit 13 (including the recognition engines) shown in FIG. 1. However, the main body controller 32 can have another arrangement, perform another recognition processing, or use recognition engines.

Figures 22, 24:
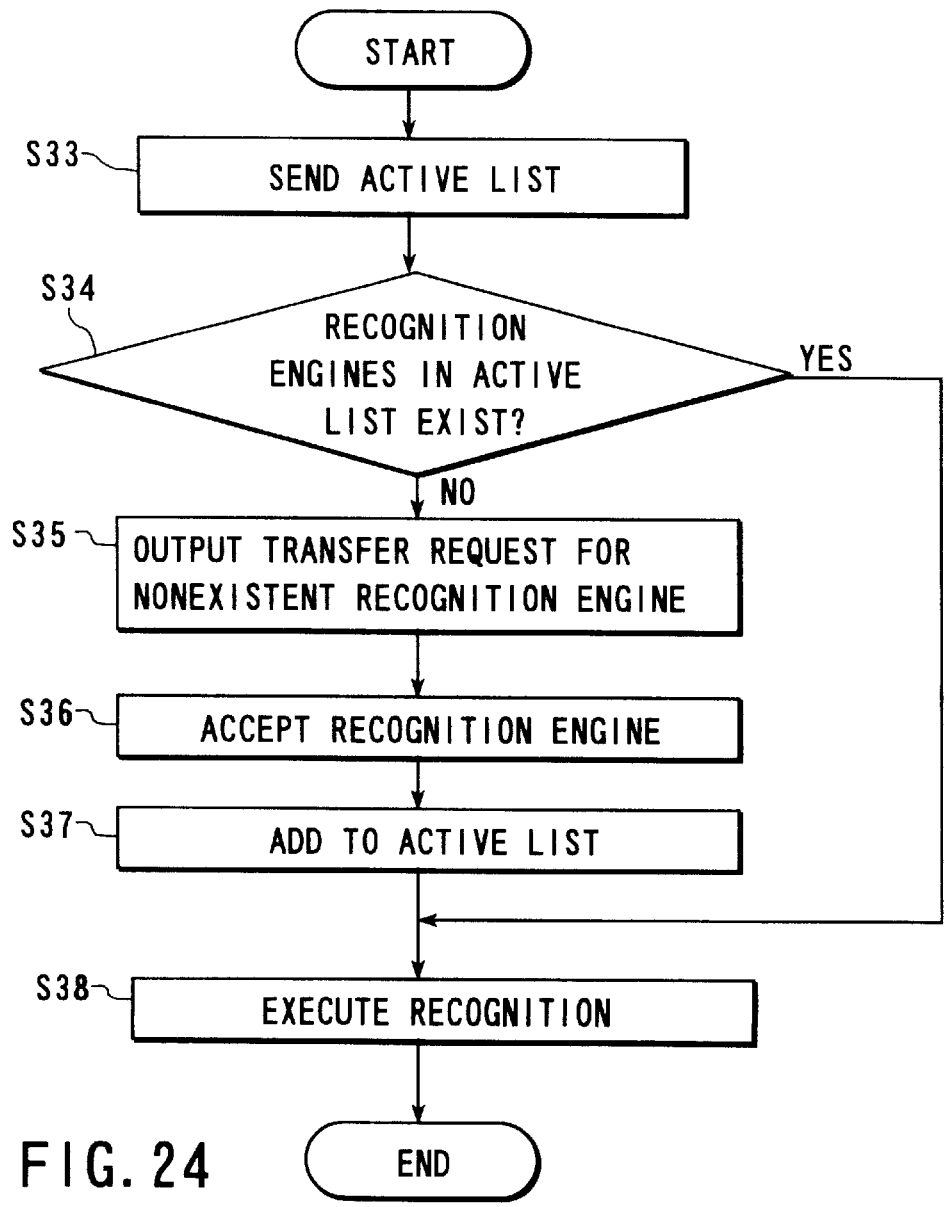
FIG. 22 is a view showing an example of a description in an active list storage unit when a vertical slider bar is selected.
FIG. 24 is a flow chart showing an example of the operation procedure of the user interface apparatus of the second embodiment.

FIG. 22 shows an example of a description in the active list storage unit when a vertical slider bar is selected. FIG. 22 shows that the cursor engine 142 and the nearest point vertical direction engine 121 are designated.

In this arrangement, the main body side sends a list of recognition engines to be activated or a list of recognition engines to be deactivated to the device side. On the device side, this list is stored in the active list storage unit 31. The recognition engine controller 30 extracts a predetermined feature amount as a recognition result from an input image in accordance with a designated recognition engine and sends back the input image and the recognition result to the main body side.

In this embodiment, the device side performs recognition processing to a certain degree. Consequently, it is possible to distribute the load and improve the speed of the recognition processing as a whole.

Also, the function of a device having an image input function can be improved.

Figure 23:
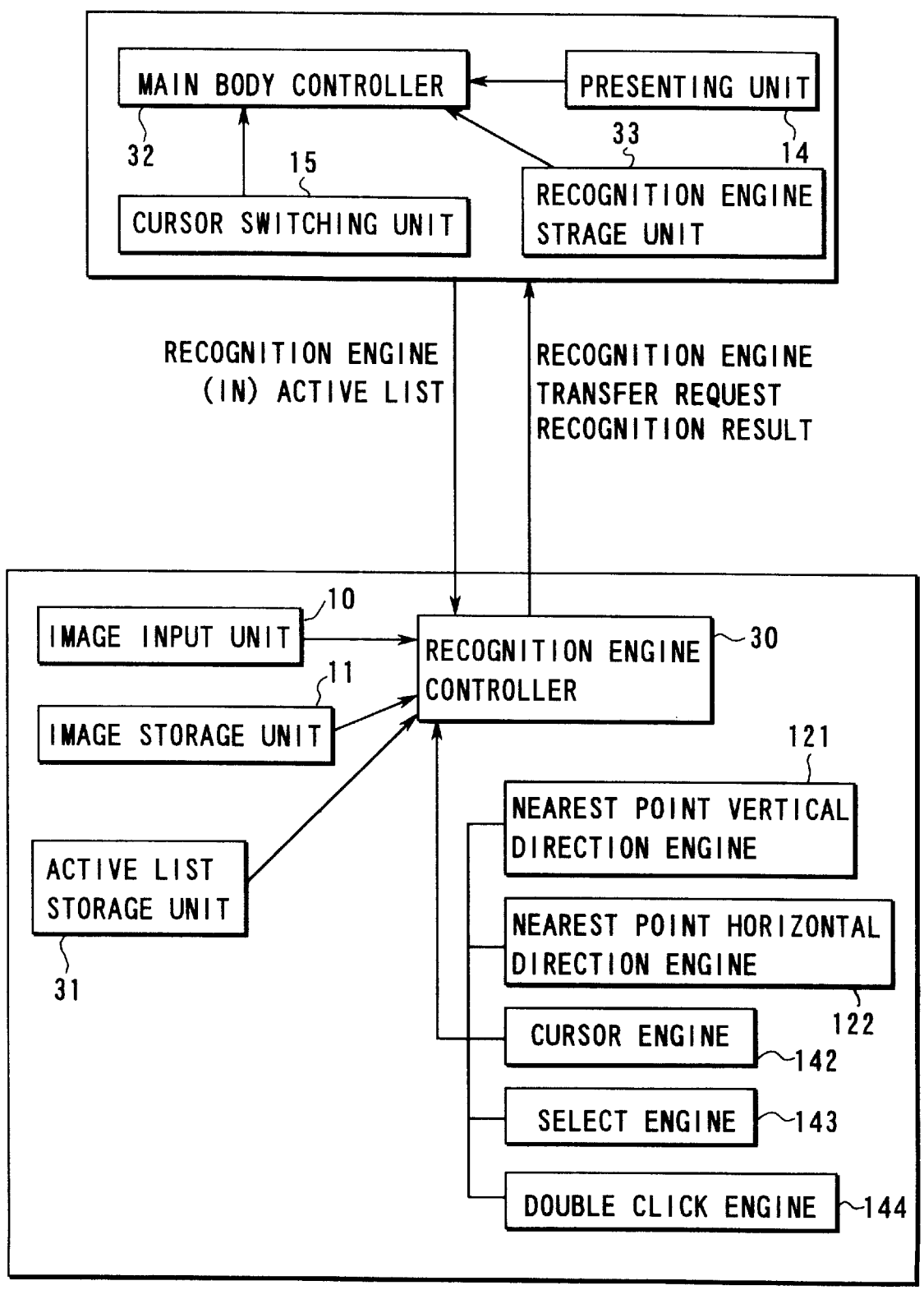
FIG. 23 is a block diagram showing another example of the arrangement of the interface apparatus according to the second embodiment of the present invention.

FIG. 23 shows another configuration of this embodiment in which a recognition engine storage unit 33 is added to the configuration in FIG. 21. FIG. 24 shows the flow of processing in FIG. 23. This flow of processing will be described below with reference to FIG. 24.

In the arrangement shown in FIG. 21, the main body sends an active list (or an inactive list) which is a list of recognition engines to be activated (or deactivated) on the device side. All recognition engines contained in the active list (or the inactive list) exist on the device side.

If recognition engines used on the device side are few, all of these recognition engines can be mounted on the device side. However, if the number of types of recognition engines is increased, all recognition engines are not thoroughly used even if all these recognition engines are mounted. This results in a decreased economical efficiency.

To eliminate this inconvenience, therefore, in the configuration shown in FIG. 23, if a recognition engine in the active list does not exist on the device side, the main body transfers the recognition engine so that the engine can be operated on the device side.

In step S33 of FIG. 24, the main body sends the active list to the device side. The recognition engine controller 30 on the device side checks whether all recognition engines described in the active list exist on the device side (step S34). If all recognition engines exist, the recognition engine controller 30 executes recognition by using these recognition engines (step S38).

On the other hand, if the recognition engine controller 30 determines in step S34 that a described recognition engine does not exist on the device side, the controller 30 sends a transfer request for the corresponding recognition engine to the main body (step S35). Upon receiving the transfer request, the main body controller 32 reads out the corresponding recognition engine from the recognition engine storage unit 33 and transfers the readout engine to the device side. The recognition engine controller 30 on the device side receives the recognition engine (step S36). The received recognition engine is written in the recognition engine controller 30. Simultaneously, the recognition engine controller 30 rewrites the active list stored in the active list storage unit 31 with the active list transferred from the main body (step S37). Thereafter, the recognition engine controller 30 executes recognition (step S38). A recognition engine to be transferred is a copy of a recognition engine stored in the recognition engine storage unit 33.

By the above processing, even if the device side does not have a certain recognition engine, recognition can be well executed by transferring the recognition engine from the main body.

When a large number of recognition engines are transferred from the main body side and consequently the recognition engines cannot be stored in the recognition engine controller 30 any longer, recognition engines not existing in the active list stored in the active list storage unit 31 are deleted, and the recognition engines transferred from the main body side are stored in the resulting empty spaces.

As a method of deleting inactive recognition engines, in addition to a method of simply deleting inactive recognition engines it is also possible to use a method of transferring inactive recognition engines to the main body side and storing them in the recognition engine storage unit 33 to prepare for the next use. If the corresponding recognition engines are already stored in the recognition engine storage unit 33, the transferred inactive recognition engines are discarded without being written.

Figure 25:
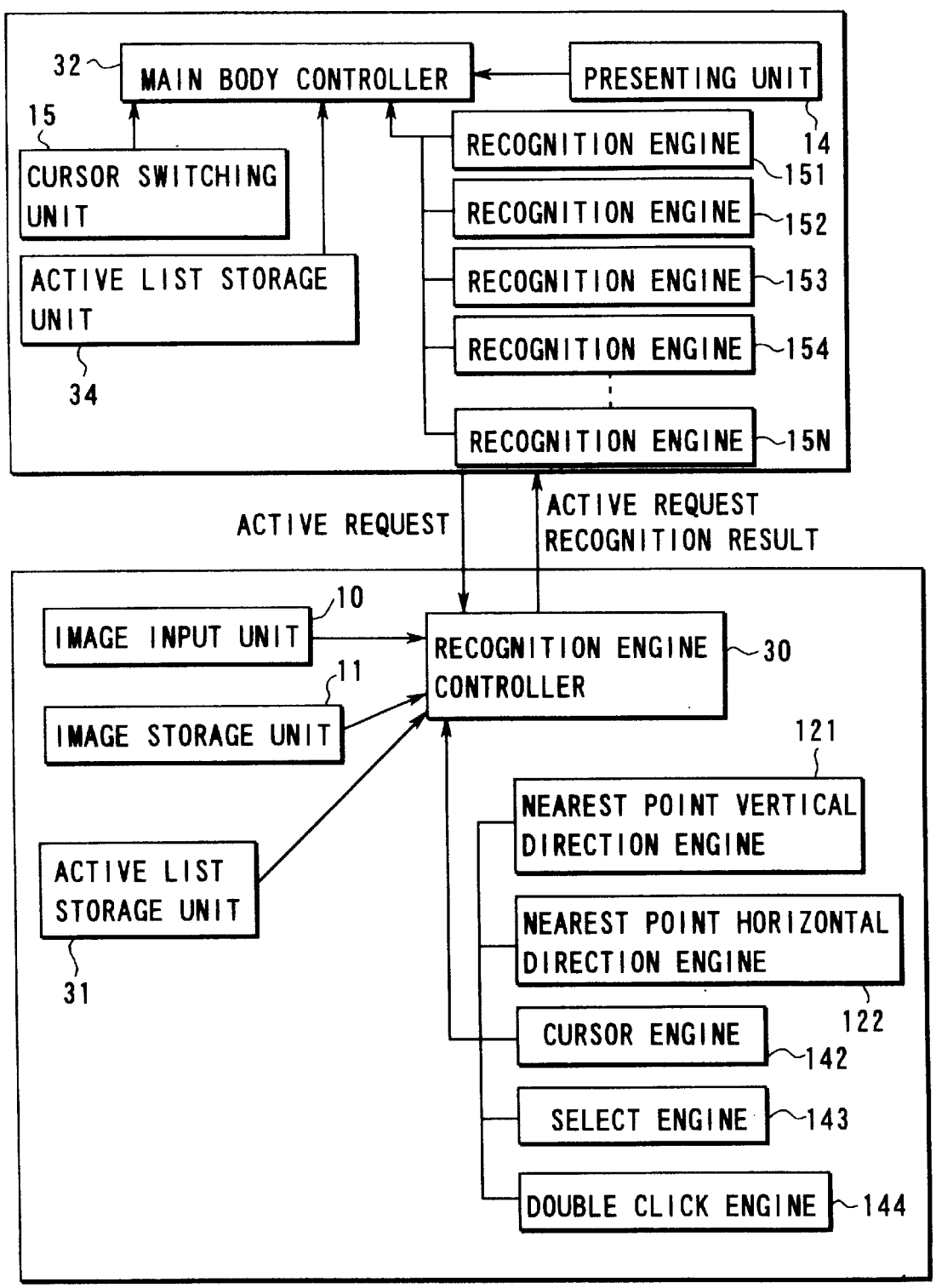
FIG. 25 is a block diagram showing still another example of the arrangement of the interface apparatus according to the second embodiment of the present invention.

FIG. 25 shows still another configuration of the interface apparatus according to this embodiment.

The main body shown in FIG. 25 is substantially the same as that shown in FIG. 23 except that, if recognition engines exist in a plurality of locations such as the main body side and the device side, the side having a recognition engine which is activated first requests the other side having an identical recognition engine to deactivate that recognition engine.

Figure 26:
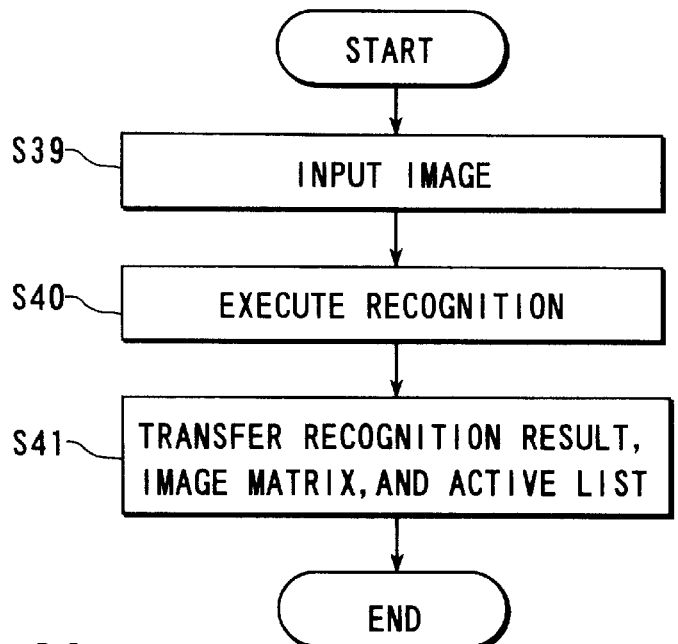
FIG. 26 is a flow chart showing an example of the operation procedure of the user interface apparatus of the second embodiment.
Figure 27:
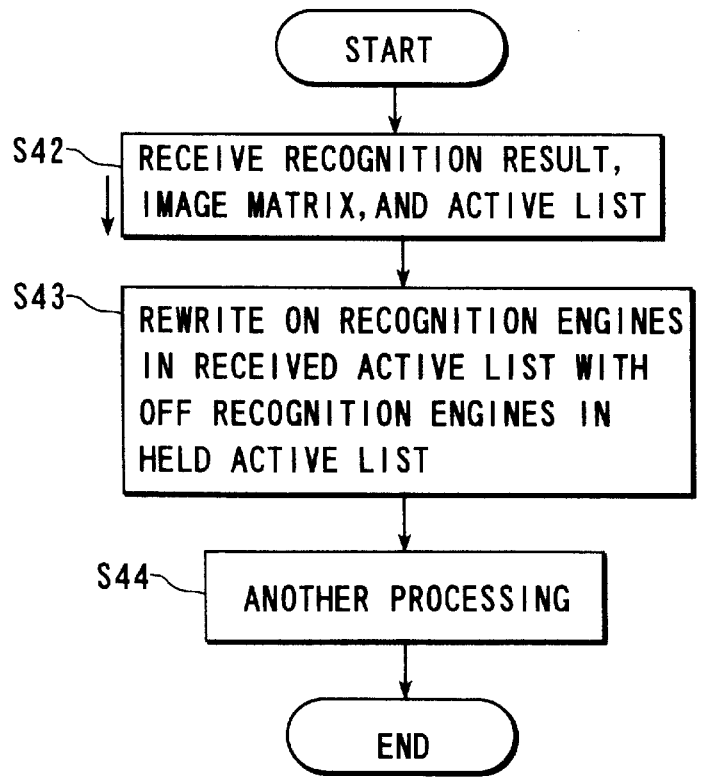
FIG. 27 is a flow chart showing an example of the operation procedure of the user interface apparatus of the second embodiment.

FIG. 26 shows an example of the operation procedure of this active request. FIG. 27 shows an example of the operation procedure of active request reception.

First, image input is performed on the device side (step S39), and recognition is executed on the main body side and/or the device side (step S40). The side which executes recognition transfers the recognition result, an image matrix, and an active list (or an inactive list) to the other side (step S41).

Next, the receiving side receives the recognition result, the image matrix, and the active list (or the inactive list) (step S42), and rewrites ON recognition engines in the received active list (or OFF recognition engines in the received inactive list) with OFF recognition engines in the stored active list (step S43). The receiving side then executes another processing where necessary (step S44).

Note that each of the above functions can also be realized by software. Furthermore, these functions can be practiced as mechanically readable media recording programs for allowing a computer to execute the procedures or the means described above.

FIGS. 28 through 38 show still another embodiment of the present invention. This embodiment checks whether an object of image processing is in a proper range within which the image processing is possible.

This embodiment of the present invention will be described below with reference to the accompanying drawings.

Figure 28:
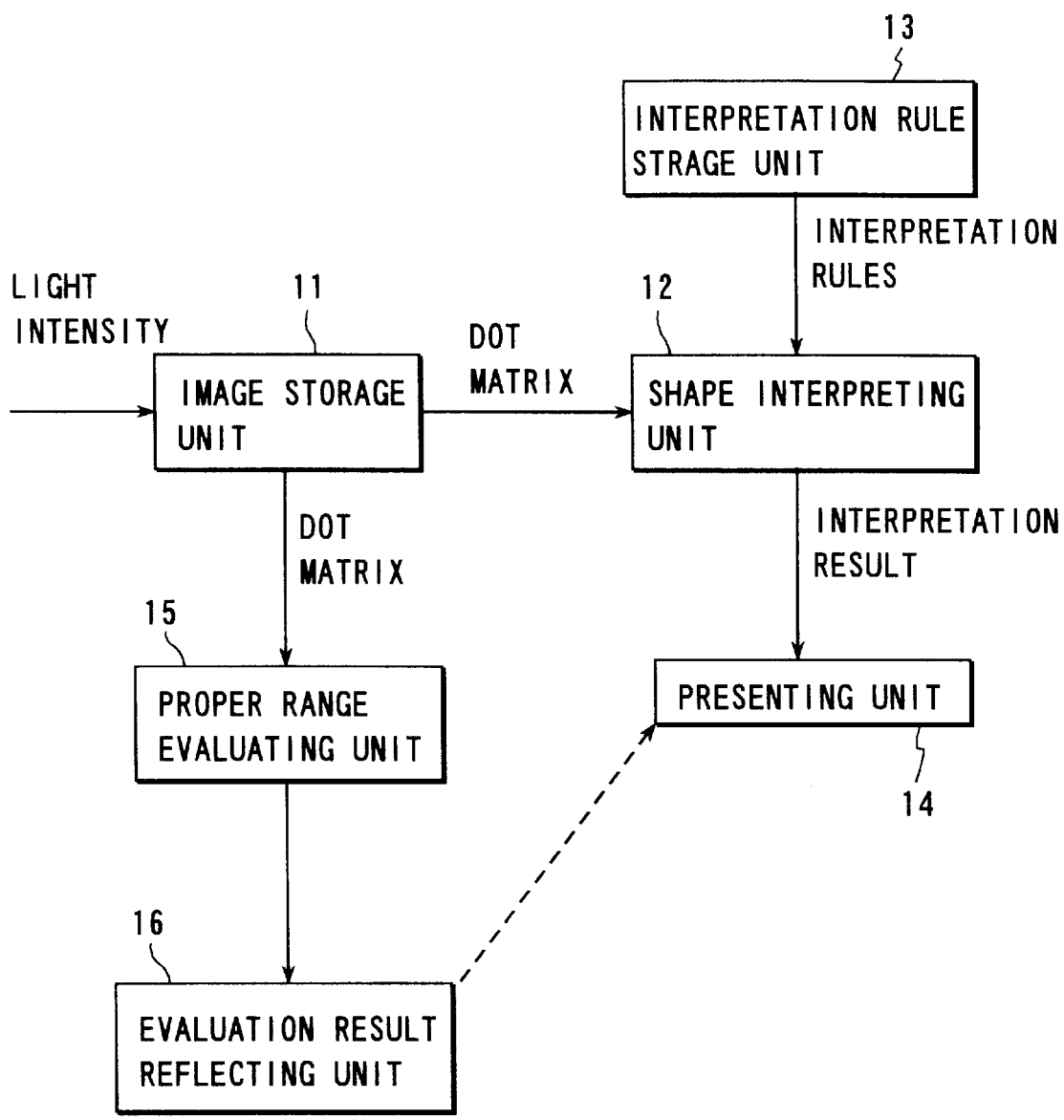
FIG. 28 is a block diagram showing an example of the arrangement of a user interface apparatus according to still another embodiment of the present invention.
Figure 29:
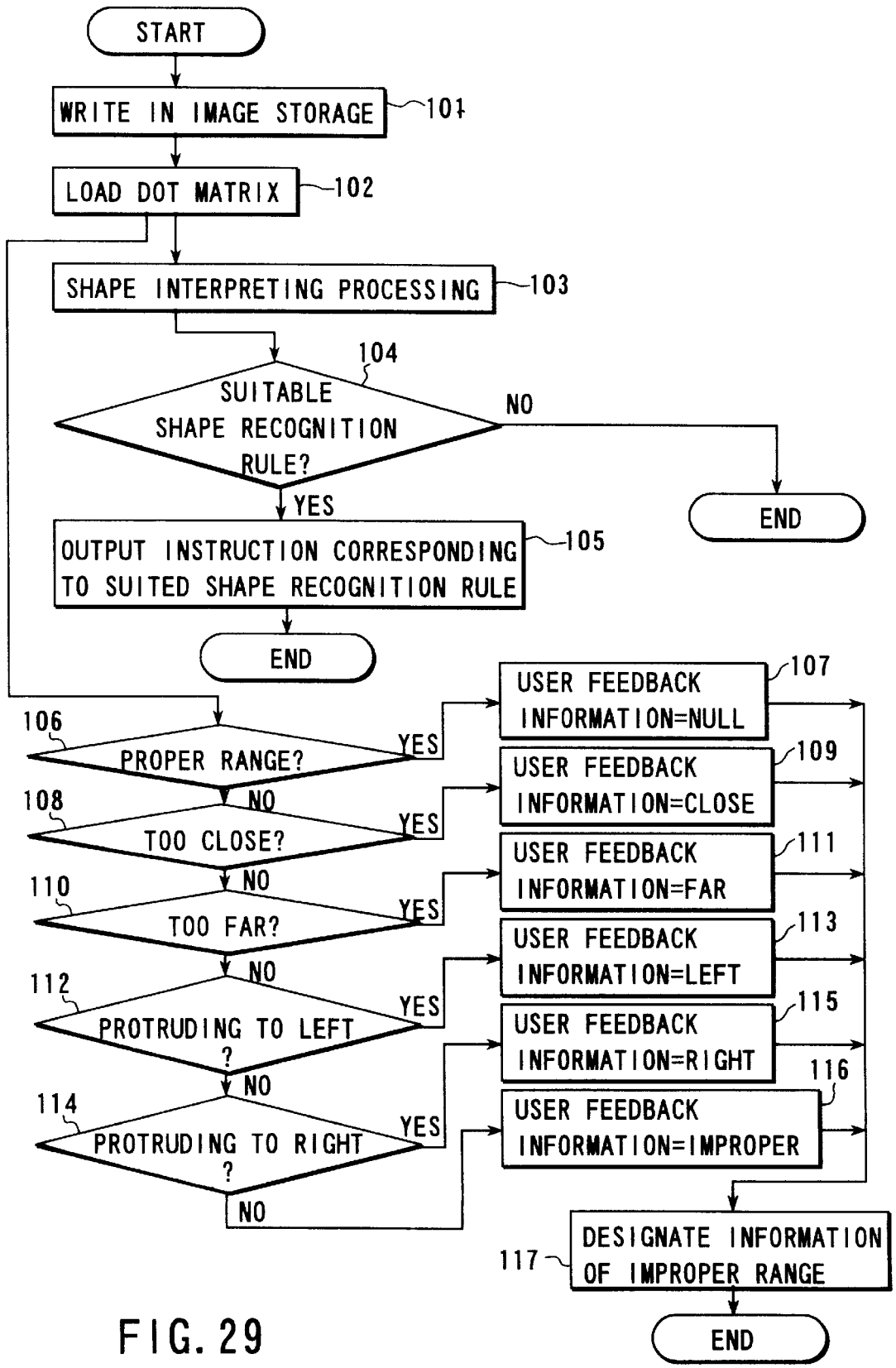
FIG. 29 is a flow chart showing an example of the process procedure of this embodiment.

FIG. 28 is a block diagram showing the arrangement of a user interface apparatus according to this embodiment of the present invention. FIG. 29 shows an example of the operation procedure of the user interface apparatus of this embodiment.

This user interface apparatus is suitably applicable to, e.g., a computer having a graphical user interface. That is, this apparatus is a system in which a cursor, a slider bar, a scroll bar, a pull-down menu, a box, a link, and icons of applications are displayed on the display screen, and a user inputs an instruction for moving a cursor, selecting an icon, or starting an application by using an input device. The input device receives inputs by performing image processing for an object such as the hand of a user without requiring any dedicated device such as a mouse.

This user interface apparatus is roughly divided into an input function section and a feedback function section.

The input function section which can be a well-known mechanism emits light, receives reflected light from an object such as the hand of a user as an image (or receives background light reflected by an object as an image), detects information of the shape, motion, or distance of the object, and performs predetermined control (e.g., control relating to I/O devices or start of application software) in accordance with the shape or the like. That is, this input function section provides a function by which a user can perform an intended input operation by, e.g., moving his or her hand. In this embodiment, the input function section includes an image storage unit 11, a shape interpreting unit 12, an interpretation rule storage unit 13, and a presenting unit 14.

The feedback function section according to the present invention checks whether an object of image detection such as the hand of a user exists in a proper range and presents the evaluation result to the user. In this embodiment, the feedback function section includes the image storage unit 11, a proper range evaluating unit 15, and an evaluation result reflecting unit 16.

The image storage unit 11 which is a common unit of the two functions and an image input device (not shown) will be described first.

The image storage unit 11 sequentially stores two-dimensional images of an object of image detection, which are output at predetermined time intervals (e.g., 1/30, 1/60, or 1/100 sec) from the image input device (not shown).

The image input device (not shown) includes a light-emitting unit and a light-receiving unit. The light-emitting unit irradiates light such as near infrared rays onto an object by using light-emitting elements such as LEDs. The light-receiving unit receives the reflected light from the object by using light-receiving elements arranged in the form of a two-dimensional array. The difference between the amount of light received when the light-emitting unit emits light and the amount of light received when the light-emitting unit does not emit light is calculated to correct the background, thereby extracting only a component of the light emitted from the light-emitting unit and reflected by the object. Note that the image input device need not have any light-emitting unit, i.e., can have only a light-receiving unit such as a CCD camera.

For example, when a user moves a hand in front of the image input device, an image of the reflected light from the hand is obtained. Each pixel value of the reflected light image is affected by the property of the object (e.g., whether the object mirror-reflects, scatters, or absorbs light), the direction of the object surface, the distance to the object, and the like factor. However, if a whole object uniformly scatters light, the amount of the reflected light has a close relationship to the distance to the object. Since a hand has this property, the reflected light image when a user moves his or her hand in front of the image input device reflects the distance to the hand, the inclination of the hand (the distance changes from one portion to another), and the like. Therefore, various pieces of information can be input and generated by extracting these pieces of information.

The input function section will be explained next.

Figure 30A:
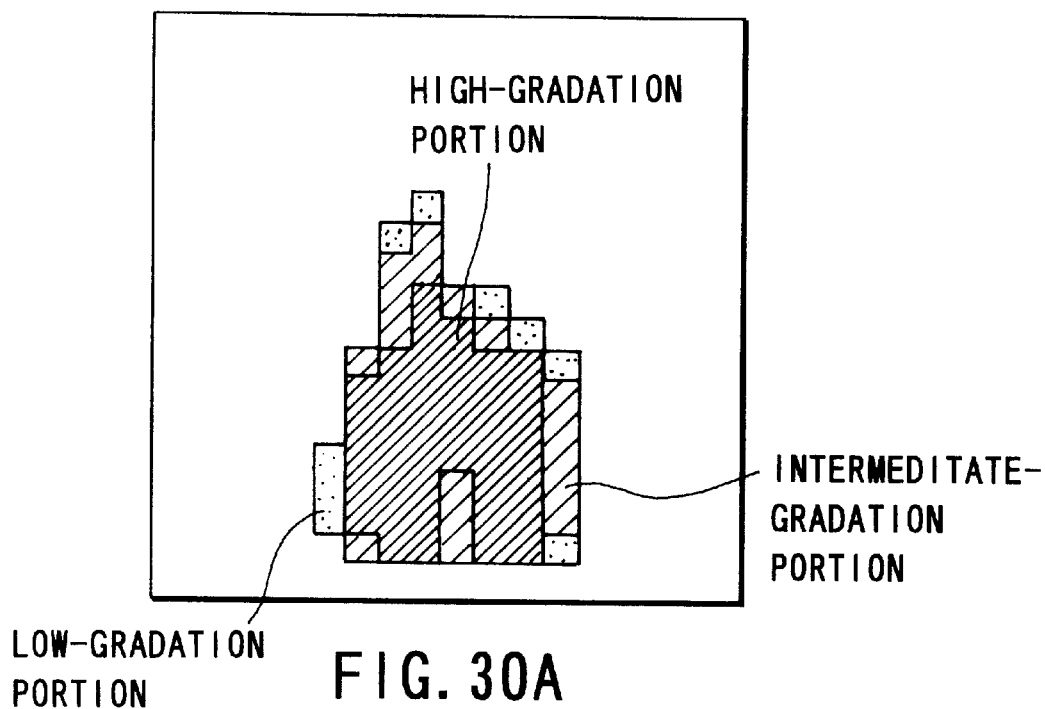
FIGS. 30A and 30B are views showing examples of a dot matrix and a screen display, respectively, when an object is in a proper range.

The shape interpreting unit 12 sequentially fetches, as an N×N (e.g., 64×64) dot matrix, the two-dimensional images stored in the image storage unit 11 (step S102). Note that each pixel has gradation levels (e.g., 8 bits=256 gradation levels). FIG. 30A shows an example of a dot matrix when a hand is an object.

Subsequently, the shape interpreting unit 12 extracts a predetermined feature amount from a dot matrix and interprets the shape on the basis of interpretation rules stored in the interpretation rule storage unit 13 (step S103). The shape interpreting unit 12 outputs an instruction corresponding to a suitable interpretation rule as an interpretation result (steps S104 and S105). If there is no suitable interpretation rule, it is also possible, where necessary, to change the way a predetermined feature amount is extracted from a dot matrix (e.g., change a threshold value when dot matrix threshold processing is performed) and again perform the matching processing. If no suitable interpretation rule is finally found (step S104), it is determined that there is no input.

The interpretation rule storage unit 13 stores interpretation rules for shape interpretation. For example, predetermined contents such as feature amounts, e.g., the shape, area, uppermost point, and barycenter of an object such as the hand of a user in a dot matrix and designation contents corresponding to these predetermined contents are stored as interpretation rules. The designation contents include, e.g., selection of an icon, start of an application, and movement of a cursor. When cursor movement is to be performed, the moving amount of a cursor corresponding to the direction and the distance of the movement of the hand is also designated. For example, the following rules are possible. That is, a state in which only the index finger is raised is used to indicate cursor movement (in this case, the distance and direction of the movement of the tip of the index finger correspond to the distance and direction of the movement of the cursor). An action of moving the thumb while only the index finger is raised is used to indicate selection of an icon in a position where the cursor exists. An action of turning the palm of the hand while only the index finger is raised is used to indicate start of an application corresponding to an icon in a position where the cursor exists.

Representative examples of the extraction of a feature amount from a dot matrix in the shape interpretation by the shape interpreting unit 12 are distance information extraction and region extraction. If an object has a uniform homogeneous scattering surface, the reflected light image can be regarded as a distance image. Accordingly, the three-dimensional shape of the object can be extracted from the light-receiving unit. If the object is a hand, an inclination of the palm of the hand, for example, can be detected. The inclination of the palm of the hand appears as the difference between partial distances. If pixel values change when the hand is moved, it can be considered that the distance changes. Also, almost no light is reflected from a far object such as a background. Therefore, in processing of cutting out a region having a certain threshold value or more from a reflected light image, the shape of an object can be easily cut out. If the object is a hand, for example, it is very easy to cut out the silhouette image of the hand. Even when a distance image is used, a general approach is to once perform region extraction by using a threshold value and then use distance information in the region.

Various methods are usable as a method of matching a feature amount extracted from a dot matrix with the interpretation rules. Examples are vector formation by which a vector is extracted from an image, extraction of a shape deformed state based on a shape model, and spectral analysis based on a distance value on a scan line.

If there is no suitable shape, the matching processing can be reexecuted by changing the threshold value or the like. If no suitable shape is finally found, it is determined that there is no input.

If the interpretation result from the shape interpreting unit 12 indicates visual information presentation to a user, the presenting unit 14 performs presentation reflecting the interpretation result from the shape interpreting unit 12 on the display device. For example, the presenting unit 14 moves a cursor, changes the shape of the cursor, and, where necessary, presents messages. Note that the message presentation is performed by using a sound reproducing device singly or in combination with the display device.

The feedback function section will be described next.

The proper range evaluating unit 15 fetches the two-dimensional image stored in the image storage unit 11 as a dot matrix as shown in FIG. 30A (step S102), checks whether the object is in a proper range, and generates feedback information corresponding to the evaluation result (steps S106 through S116).

On the basis of the feedback information, the evaluation result reflecting unit 16 outputs an instruction for performing presentation reflecting the evaluation result by using the display device and/or the sound reproducing device (step S117).

First, details of the proper range evaluating unit will be described below.

If an object is in a proper range, an appropriate dot matrix as shown in FIG. 30A, for example, is obtained, and a desired input operation using the hand of a user or the like is possible. However, if the object is outside the proper range, more specifically, if the object is too close to or too far from the light-receiving unit or protrudes to the left or the right from the light-receiving unit, no desired instruction or the like by the user can be input.

Accordingly, the proper range evaluating unit 15 analyzes a dot matrix and checks whether the object is in the proper range (step S106), is too close (step S108) or too far (step S110), or protrudes to the left (step S112) or to the right (step S114). If the object is in the proper range, the proper range evaluating unit 15 sets user feedback information=NULL (or a code indicating NULL; e.g., 0) (step S107). If the object is too close, the unit 15 sets user feedback information=close (or a code indicating close; e.g., 1) (step S109). If the object is too far, the unit 15 sets user feedback information=far (or a code indicating far; e.g., 2) (step S111). If the object protrudes to the left, the unit 15 sets user feedback information=left (or a code indicating left; e.g., 3) (step S113). If the object protrudes to the right, the unit 15 sets user feedback information=right (or a code indicating right; e.g., 4) (step S115). Otherwise, the unit 15 sets user feedback information=improper (step S116).

Figure 31:
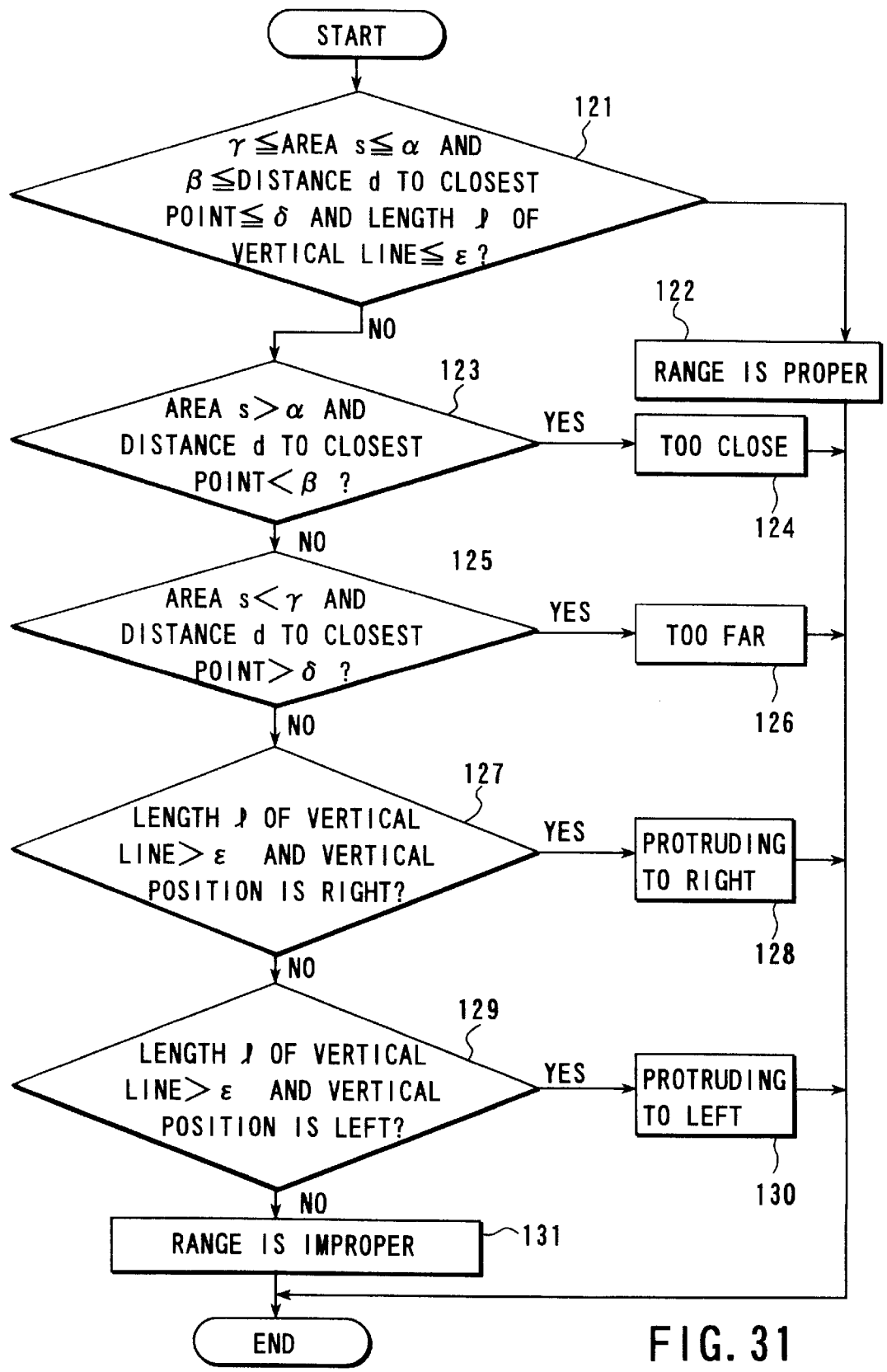
FIG. 31 is a flow chart showing an example of the evaluation procedure of checking whether an object is in a proper range.

FIG. 31 shows an example of this evaluation procedure. FIGS. 30A, 34A, 35A, 36A, and 37A show dot matrix examples when an object is in a proper range, is too close, is too far, protrudes to the left, and protrudes to the right, respectively.

Figure 32:
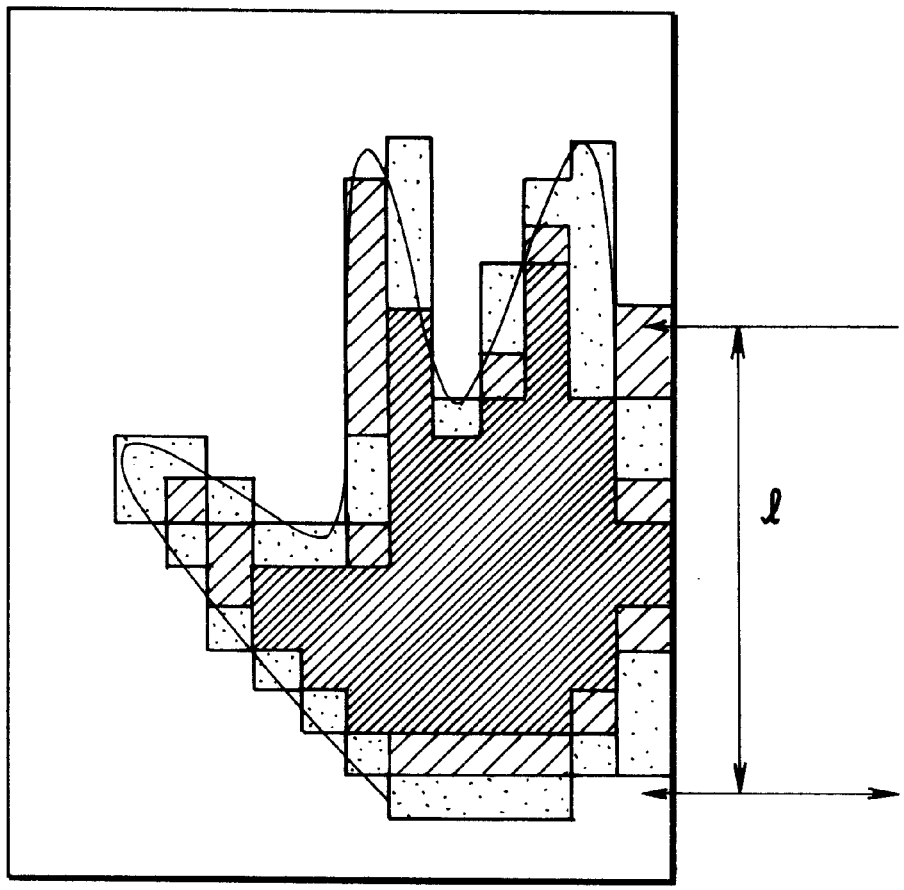
FIG. 32 is a view for explaining a length *liter* of a vertical line in the image shape of an object.

Various methods are possible in checking whether an object is in a proper range. In this embodiment, let s be the area of an image of an object, be the distance to a closest point in the image of the object, and 1 be the length of a vertical line in the image shape of the object. The area s of the image of the object can be represented by the number of pixels corresponding to the object in a dot matrix or the ratio of these pixels in all pixels of the dot matrix. The distance d to the closest point in the image of the object can be represented by the reciprocal of a maximum value of the density of the pixels corresponding to the object in the dot matrix or by possible highest density of pixels—maximum value of density. As shown in FIG. 32, the length 1 of the vertical line in the image shape of the object can be represented by the maximum number of vertically continuous pixels in the outer shape of the image of the object in the dot matrix.

A lower-limiting value $\gamma$ and an upper-limiting value $\alpha$ of the area a, a lower-limiting value $\beta$ and an upper-limiting value $\delta$ of the distance d to the closest point in the image, and an upper-limiting value $\epsilon$ of the length 1 of the vertical line in the image shape are set.

If $\gamma \leq$ area s $\leq \alpha$, $\beta \leq$ distance d to closest point $\leq \delta$, and length 1 of vertical line $\leq \epsilon$ (step S121), the range is proper (step S122).

If area s≦α and distance d to closest point≦β (step S123), the object is too close (step S124).

If area s≦γ and distance d to closest point>δ (step S125), the object is too far (step S126).

If length 1 of vertical line>ε and the position of the vertical line is right (step S127), the object is protruding to the right (step S128).

If length 1 of vertical line≦δ and the position of the vertical line is left (step S129), the object is protruding to the left (step S130).

Otherwise, the range is improper (step S131).

Details of the evaluation result reflecting unit 16 will be described next.

Figure 33:
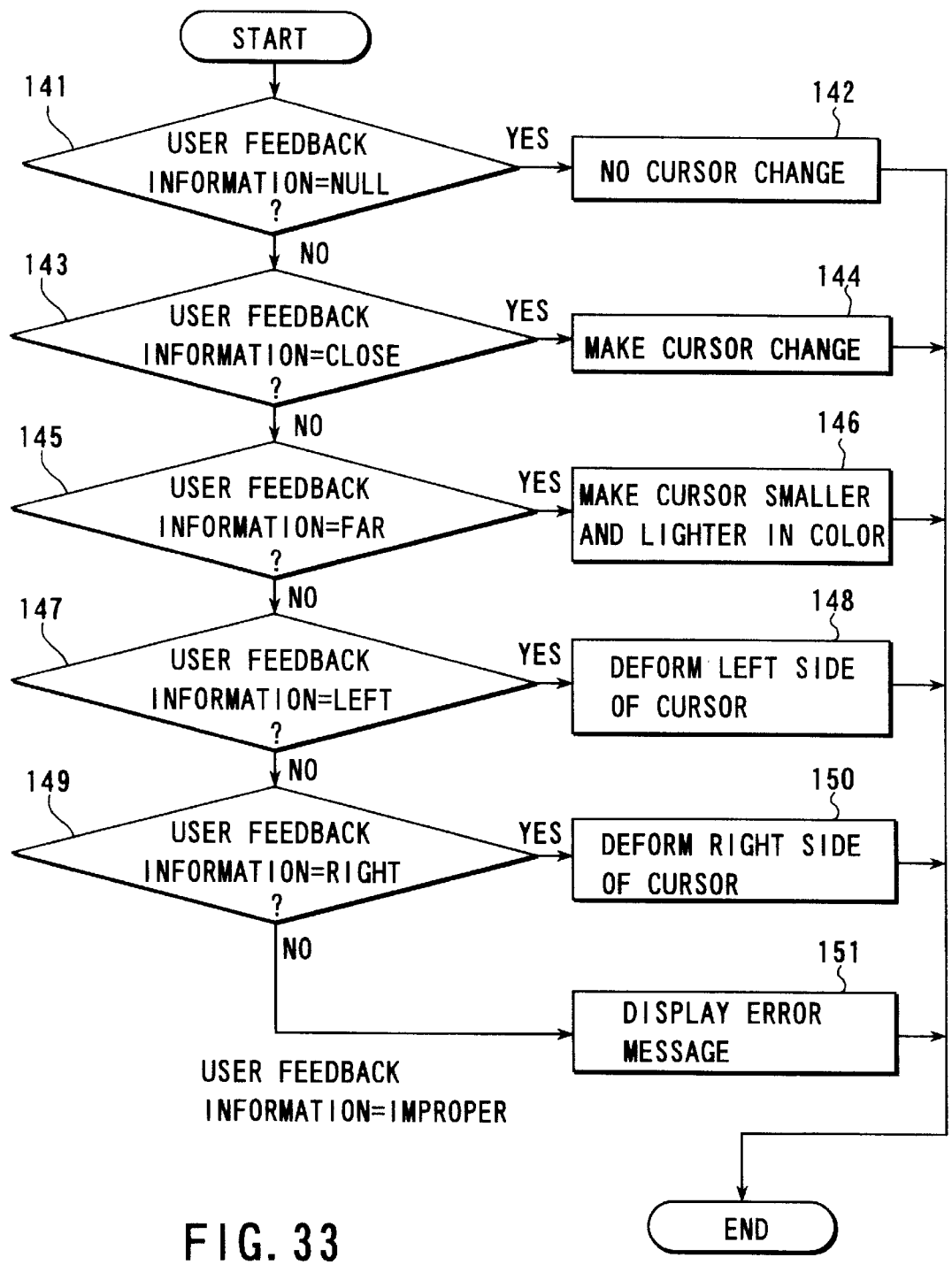
FIG. 33 is a flow chart showing an example of the procedure of reflecting the evaluation result.

FIG. 33 shows an example of this process procedure. In this processing, the evaluation result reflecting unit 16 deforms the shape of a cursor displayed on the display screen on the basis of the user feedback information supplied as the evaluation result from the proper range evaluating unit 15, thereby informing a user of the evaluation result.

Figure 30B:
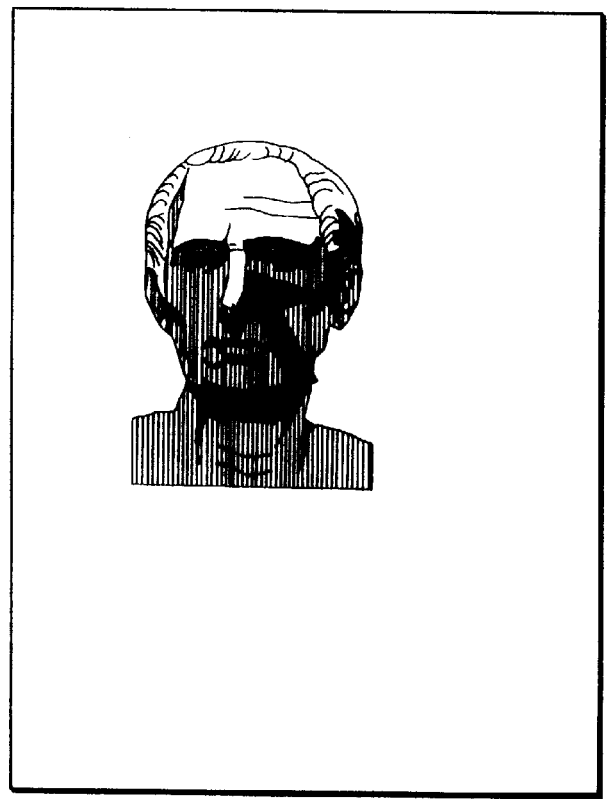

If user feedback information=NULL (step S141), the evaluation result reflecting unit 16 does not change the shape of the cursor (step S142). FIG. 30B shows an example of this state.

If user feedback information=close (step S143), the unit 16 makes the cursor larger as shown in FIG. 34B (step S144).

Figure 35A:
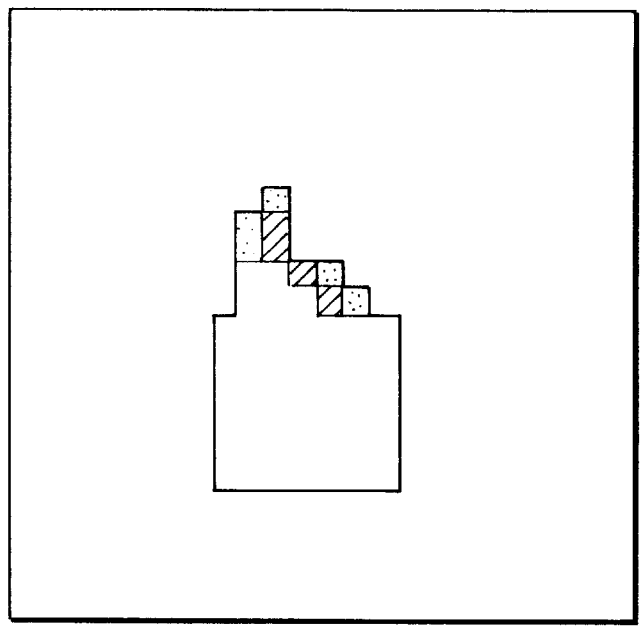
FIGS. 35A and 35B are views showing examples of a dot matrix and a screen display, respectively, when an object is too far.
Figure 35B:
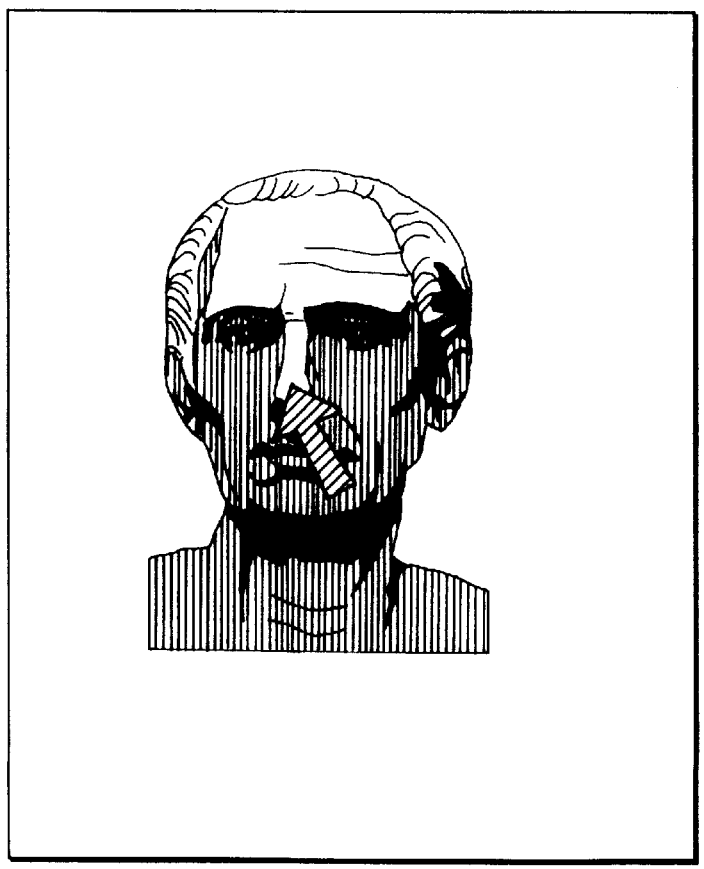

If user feedback information=far (step S145), the unit 16 makes the cursor smaller and thinner as shown in FIG. 35B (step S146).

Figure 36A:
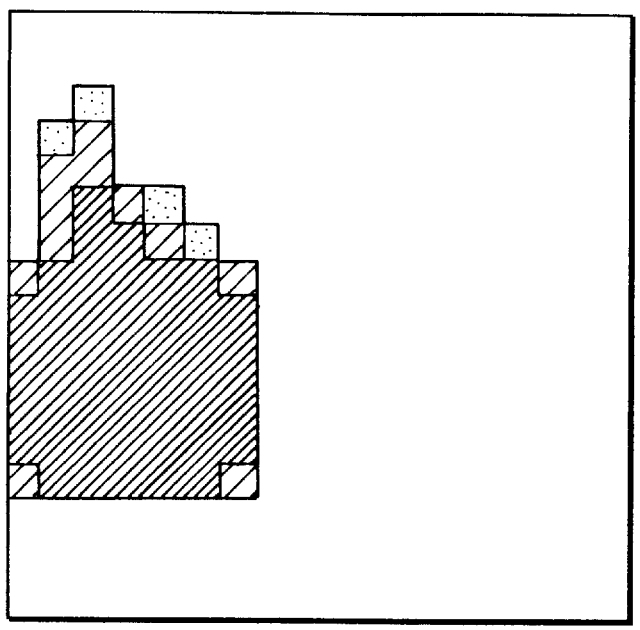
FIGS. 36A and 36B are views showing examples of a dot matrix and a screen display, respectively, when an object protrudes to the left.
Figure 36B:
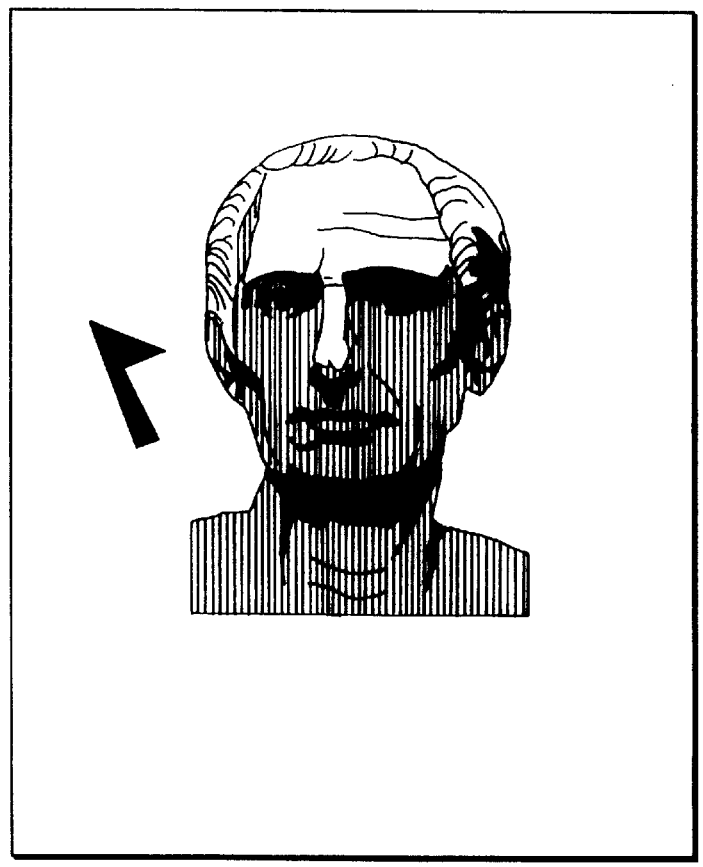

If user feedback information=left (step S147), the unit 16 deforms the left side of the cursor as shown in FIG. 36B (step S148).

Figure 37A:
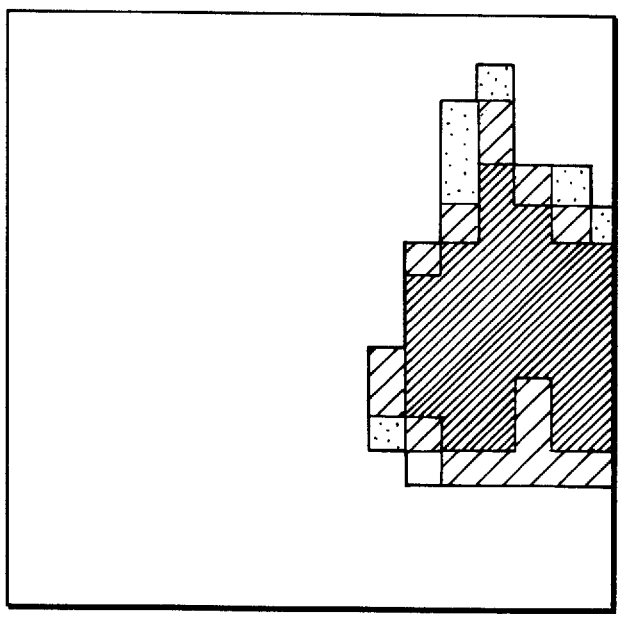
FIGS. 37A and 37B are views showing examples of a dot matrix and a screen display, respectively, when an object protrudes to the right.
Figure 37B:
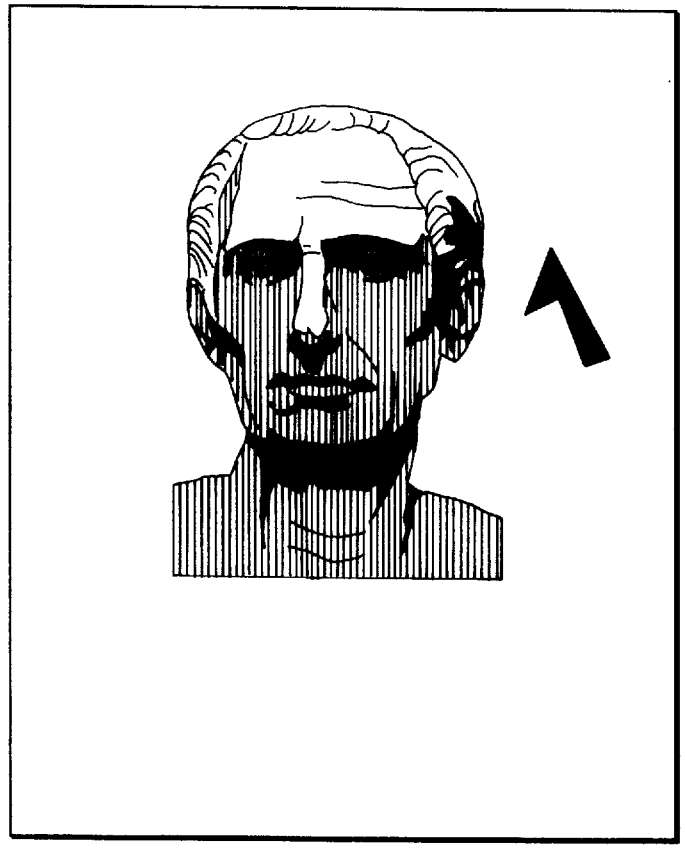

If user feedback information=right (step S149), the unit 16 deforms the right side of the cursor as shown in FIG. 37B (step S150).

If user feedback information=improper, the unit 16 displays an error message (step S151).

Figure 38:
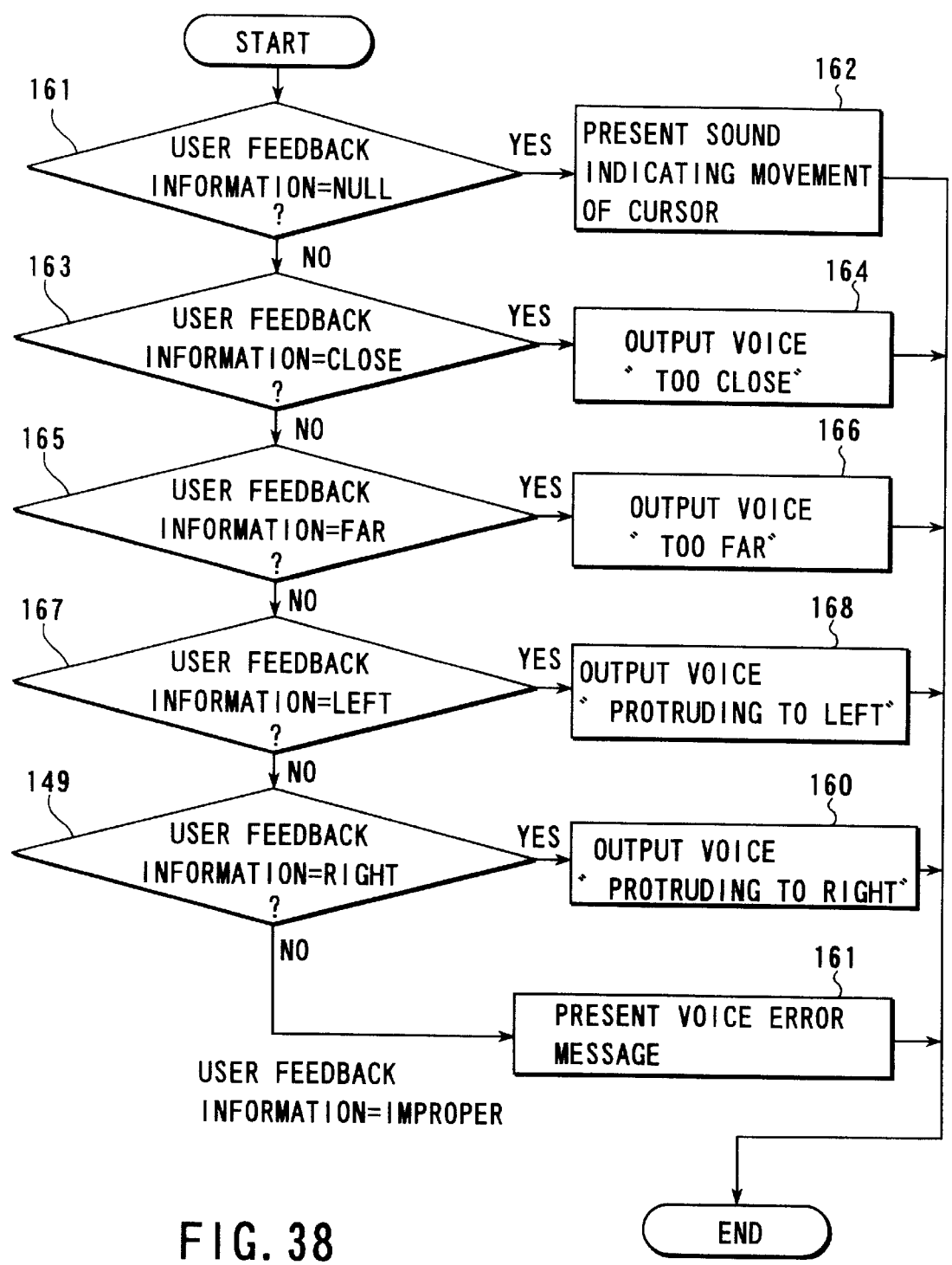
FIG. 38 is a flow chart showing another example of the procedure of reflecting the evaluation result.

FIG. 38 shows another example of this process procedure. In this processing, the evaluation result reflecting unit 16 informs a user of the evaluation result by sound by using the sound reproducing device on the basis of the user feedback information supplied as the evaluation result from the proper range evaluating unit 15.

If user feedback information=NULL (step S161), the evaluation result reflecting unit 16 does not present anything or presents sound indicating the movement of the cursor (step S162).

If user feedback information=close (step S163), the unit 16 causes the sound reproducing device to output voice such as "too close" (step S164).

If user feedback information=far (step S165), the unit 16 causes the sound reproducing device to output voice such as "too far" (step S166).

If user feedback information=left (step S167), the unit 16 causes the sound reproducing device to output voice such as "protruding to the left" (step S168).

If user feedback information=right (step S169), the unit 16 causes the sound reproducing device to output voice such as "protruding to the right" (step S170).

If user feedback information=improper, the unit 16 presents a voice error message.

Note that messages can also be informed by images and sounds by using both the processing in FIG. 33 and the processing in FIG. 38. Alternatively, it is possible to prepare a function of informing by images and a function of informing by sounds and allow a user to separately turn on and off these functions.

In this embodiment as described above, if an object such as the hand of a user deviates from a proper range, this information is presented. Therefore, the user can readily recognize the proper range in a three-dimensional space and input a desired instruction or the like by performing gesture in the proper range.

In the procedure shown in FIG. 29, the processing of the input function section and the processing of the feedback function section are independently executed. However, this procedure can be so corrected that the processing of the feedback function section is performed prior to the processing of the input function section and the processing of the input function section is executed only when it is determined that an object is in a proper range.

Also, each of the above functions can be realized by software. Furthermore, these functions can be practiced as mechanically readable media recording programs for allowing a computer to execute the procedures or the means described above.

The present invention is not limited to the above embodiments and can be practiced in the form of various modifications without departing from the technical range of the invention.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A user interface apparatus comprising:

a first device configured to input a reflected image as an input image; and a second device configured to perform input by image processing of said input image, wherein said second device comprises a designating unit configured to designate a recognition engine configured to recognize and extract at least one respective variation in said input image to implement a corresponding action associated with a result of image processing of said input image, said first device comprises a performing unit configured to perform predetermined image processing on the basis of the designated recognition engine, and a sending unit configured to send back the input image and a result of the image processing to said second device, and each of said first and second devices further comprises a requesting unit configured to request, when information necessary for image processing suited to a predetermined recognition engine in the device is activated first, the other device to deactivate identical information, and a deactivating unit configured to deactivate information necessary for image processing suited to a predetermined recognition engine when requested to deactivate the information by the other device.

2. An apparatus according to claim 1, wherein said first device further comprises a requesting unit configured to request said second device to transfer information necessary for image processing suited to a necessary recognition engine, if said first device does not have an image processing unit suited to the recognition engine, and said second device further comprises a transferring unit configured to transfer the requested information to said first device.

3. An instruction input method using a user interface apparatus including a first device configured to input a reflected image as an input image and a second device configured to perform input by image processing of said input image, comprising the steps of:

allowing said second device to designate a recognition engine configured to recognize and extract at least one respective variation in said input image to implement a corresponding action associated with a result of image processing of said input image, allowing said first device to perform predetermined image processing on the basis of the designated recognition engine, and send back the input image and a result of the image processing to said second device, and allowing each of said first and second devices to request, when information necessary to image processing suited to a predetermined recognition engine in the one of the first and second device is activated first, the other device to deactivate identical information and to deactivate information necessary for image processing suited to a predetermined recognition engine when requested to deactivate the information by the other device.

4. An article of manufacture comprising:

a computer usable medium having computer readable program code means embodied therein for causing an instruction to be input using a user interface apparatus including a first device for inputting a reflected image and a second device for performing input by image processing of an input image, the computer readable program means in said article of manufacture comprising:

computer readable program code means for causing a computer to allow said second device to designate a recognition engine configured to recognize and extract at least one respective variation in said input image to implement a corresponding action associated with a result of image processing of said input image;

computer readable program code means for causing a computer to allow said first device to perform predetermined image processing an the basis of the designated recognition method and send back the input image and a result of the image processing to said second device; and computer readable program code means for causing a computer to allow each of said first and second devices to request, when information necessary for image processing suited to a predetermined recognition engine in one of the first and second devices is activated first, the other device to deactivate identical information, and to deactivate information necessary for image processing suited to a predetermined recognition engine when requested to deactivate the information by the other device.

* * * * *